(12) United States Patent
Guinn

(10) Patent No.: US 11,813,536 B2
(45) Date of Patent: *Nov. 14, 2023

(54) EXTENDED-REALITY PROJECTILE-FIRING GAMING SYSTEM AND METHOD

(71) Applicant: Gel Blaster, Inc., Austin, TX (US)

(72) Inventor: Colin Guinn, Hutto, TX (US)

(73) Assignee: GEL BLASTER, INC., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/095,383

(22) Filed: Jan. 10, 2023

(65) Prior Publication Data

US 2023/0158411 A1     May 25, 2023

Related U.S. Application Data

(63) Continuation of application No. 17/862,001, filed on Jul. 11, 2022, now Pat. No. 11,759,717.
(Continued)

(51) Int. Cl.
*A63F 13/837*     (2014.01)
*A63F 13/53*     (2014.01)
(Continued)

(52) U.S. Cl.
CPC .......... *A63F 13/837* (2014.09); *A63F 13/212* (2014.09); *A63F 13/216* (2014.09);
(Continued)

(58) Field of Classification Search
None
See application file for complete search history.

(56) References Cited

U.S. PATENT DOCUMENTS 6,807,959 B1 * 10/2004 Murdock .............. A63B 69/409
                                                                                124/61
7,796,155 B1     9/2010 Neely et al.
(Continued)

FOREIGN PATENT DOCUMENTS

WO     2013049901 A1     4/2013
WO     2018224847 A2     12/2018

OTHER PUBLICATIONS

International Search Report and Written Opinion issued in PCT/US22/36718.

*Primary Examiner* — Jason A Pringle-Parker
(74) *Attorney, Agent, or Firm* — Jeffer Mangels; Butler & Mitchell LLP; Brennan C. Swain, Esq.

(57) ABSTRACT

An extended-reality projectile-firing gaming system includes a projectile-firing device, a battlefield object configured to detect impact of projectiles thereon, a network configured to provide communication and control connectivity in accordance with at least one protocol to the projectile-firing device and the wearable device, and an extended-reality gaming application. The application controls the projectile-firing device and the wearable device, receives projectile-firing device data from the projectile-firing device, receives battlefield object data from a battlefield object, the battlefield object data indicating that an impact occurred on the battlefield object, and the time the battlefield object was impacted, and updates gaming metric data to indicate a successful impact of the fired projectile on the battlefield object and a successful hit by the projectile-firing device on the battlefield object when the time the impact occurred on the battlefield object and the time the projectile was fired occur within a predetermined time period.

26 Claims, 8 Drawing Sheets

Related U.S. Application Data

(60) Provisional application No. 63/220,343, filed on Jul. 9, 2021.

(51) Int. Cl.
  *A63F 13/212* (2014.01)
  *A63F 13/46* (2014.01)
  *A63F 13/216* (2014.01)

(52) U.S. Cl.
  CPC .............. *A63F 13/46* (2014.09); *A63F 13/53* (2014.09); *A63F 2300/69* (2013.01); *A63F 2300/8082* (2013.01)

(56) References Cited

U.S. PATENT DOCUMENTS

| | | | |
|---|---|---|---|
| 8,105,087 B2 * | 1/2012 | Valentini | F41J 5/056 434/11 |
| 8,360,042 B2 * | 1/2013 | Skilling | F41B 11/70 124/71 |
| 8,523,185 B1 * | 9/2013 | Gilbreath | F41J 5/14 434/23 |
| 9,355,583 B2 | 5/2016 | Seisner et al. | |
| 9,573,064 B2 | 2/2017 | Kinnebrew et al. | |
| 9,759,530 B2 * | 9/2017 | Miller | F41J 5/14 |
| 11,156,424 B1 * | 10/2021 | Cai | F41A 33/02 |
| 2007/0151551 A1 * | 7/2007 | Verini | F41B 11/721 124/74 |
| 2010/0013860 A1 * | 1/2010 | Mandella | G06F 3/04815 345/157 |
| 2010/0093436 A1 * | 4/2010 | Lander | F41G 3/2655 463/37 |
| 2013/0321718 A1 | 12/2013 | Huang | |
| 2014/0361976 A1 * | 12/2014 | Osman | G02B 27/017 345/156 |
| 2015/0038048 A1 * | 2/2015 | Rosenberg | F41A 33/00 473/570 |
| 2015/0080071 A1 * | 3/2015 | Eyal | A63F 13/213 463/2 |
| 2015/0260474 A1 * | 9/2015 | Rublowsky | F41A 33/00 434/16 |
| 2016/0041391 A1 * | 2/2016 | Van Curen | A63F 13/211 345/633 |
| 2016/0292924 A1 * | 10/2016 | Balachandreswaran | G06F 3/012 |
| 2017/0116874 A1 * | 4/2017 | Holcomb | G09B 9/003 |
| 2017/0148339 A1 * | 5/2017 | Van Curen | G06T 19/006 |
| 2017/0191800 A1 * | 7/2017 | Fischer | F41J 5/02 |
| 2019/0063884 A1 * | 2/2019 | McBride | F41J 5/10 |
| 2019/0353457 A1 * | 11/2019 | Northrup | G01S 5/16 |
| 2019/0374857 A1 * | 12/2019 | Deller | G06T 13/40 |
| 2021/0199408 A1 * | 7/2021 | Reed | G06N 3/08 |

\* cited by examiner

EXTENDED-REALITY PROJECTILE-FIRING GAMING SYSTEM AND METHOD

CROSS-REFERENCE TO RELATED APPLICATIONS

This application is a continuation of U.S. patent application Ser. No. 17/862,001 filed Jul. 11, 2022, which claims the benefit of U.S. Provisional Patent Application No. 63/220,343, filed on Jul. 9, 2021, the entirety of which is incorporated by reference herein.

FIELD OF THE INVENTION

The present invention relates generally to projectile-firing gaming ecosystems and more particularly to an extended-reality projectile-firing gaming system and method.

BACKGROUND OF THE INVENTION

Indoor or outdoor shooting, blaster or skirmish sports, such as paintball, laser tag, air soft and the like are popular games and hobbies that allow people to run, exercise and have fun. Other shooting exercises, such as hunting, military and police training also involve physical activity. One example of a popular shooting device and game is Gel Blaster. Many people also enjoy video games and, in particular, video games that include guns or shooting (e.g., first-person shooter video games). However, playing video games can be sedentary. A need exists for a way to digitize physical projectile firing or shooting sports and training (such as military training, as discussed above) by adding some of the advantages of video games and/or virtual reality, such as by the utilization of augmented reality. U.S. Pat. Nos. 7,796,155, 9,355,583 and 9,573,064 are incorporated by reference herein in their entireties.

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

Generally, the present invention includes "video gamifying" a real life paintball/gel blaster/combat experience using augmented reality. The present invention in a preferred embodiment includes a system of wirelessly interconnected blasters, targets, wearables, and "battlefield" objects that allow players to engage in precisely tracked and managed projectile sports and games, resulting in an experience of "Video Games Outside". This system contrasts with projectile-only sports such as airsoft and paintball, which provide tactile feedback but lack automatic score tracking and other digital features. It also contrasts with laser tag or non-projectile-firing sports, which may provide real-time access and control over scoring, game modes, weapon features, etc., but lack tactile feedback, and has to make use of non-intuitive and mostly invisible light physics. In contrast, the present invention includes a system utilizing visible projectile physics and methodology to keep track of score and other gameplay features.

In a preferred embodiment, the present invention includes digitizing an outdoor/indoor blaster gameplay experience thereby providing a mixed reality video game experience through the use of augmented reality (AR), virtual reality (VR), and/or extended-reality (XR) eyewear (goggles, glasses, helmet, etc.) while also including blasters that shoot or fire actual projectiles. It will be appreciated that the projectiles cause the human target a sufficient amount of sensation such that it makes the experience engaging. It will be appreciated that the use of the blaster shown in the accompanying drawings is only exemplary and not limiting. Any type of blaster, gun, etc., that shoots projectiles (e.g., projectile-firing device) is within the scope of the present invention.

The AR/VR/XR eyewear and/or other wearable items, such as vests, pants, belts, shoes, uniforms, jerseys, suits, and the like and the connected system (including all software, programming, architecture, sensors, wireless connectivity, networking, tracking codes, trackers, etc.) allows the participants to integrate video game type elements and graphics (e.g., having a life bar, different types of ammunition, levels, etc.) within a blaster game, experience or training.

In a preferred embodiment, the present invention includes a vest/jersey or other wearable that can sense or determine when a player is hit or struck by a projectile (in an embodiment, at least within certain areas on the outer surface of the wearable). For example, the wearable and connected system can sense or log a hit from the front or the back. In a preferred embodiment, the wearable can log or determine the strength, level or intensity of the impact of the projectile. Alternatively, the application, or a combination of the wearable and the application, can log or determine the strength, level or intensity of the impact of the projectile. Therefore, when a player (or the wearable) is struck from a closer range the player loses a greater amount of health points than from a further range.

In a preferred embodiment, the system can determine which other participant or player shot the player that is hit. This may be done using a location and direction solution in each blaster, e.g., ultra-wide band (UWB) sensors, magnetometer, GPS, WiFi, etc., combined with knowing who is shooting at any given time (so the system can know or determine the approximate time delay between a player firing and when the wearable is hit). The wearable may include buttons or other switches that when pushed or switched cause actions to be taken within the game whether in the AR/VR/XR/virtual environment or in the physical world. For example, pushing a button or touching a predetermined location on the wearable or on a strap or other worn item may cause the player's health points or level to increase after they were previously earned. Any gaming event can be associated with the switch, button or the like.

In a preferred embodiment, a software application ("app" or "application") is configured to be usable by all players or participants. The app can provide many different features, including app/game-controlled rate of fire on the blaster. The rate of fire feature (and any other game or invention related feature described herein) can be changeable or upgradeable based on gameplay and other predetermined features. For example, if the player visits a predetermined location and finds a upgraded weapon gun or the like or plays the game for a predetermined length of time, the player may earn a higher rate of fire. If a player has a better or higher level weapon in the game, the player has the ability to cause more damage faster to other players wearing the system connected wearables. The system may include a system-on-chip (SOC) or system-on-module in or on a module connectable to the blaster that connects to the app wirelessly (e.g., via Bluetooth).

The app and system can then control the rate of fire of the blaster. This feature allows for a single blaster to represent many different potential digital weapons in the "game." For example, a starter weapon might only allow for one shot per second in semi-auto mode and require a four second reload time after ten shots, while the top-end weapon in the game allows for ten shots per second in fully automatic mode and does not impose any "digital reload/time requirements." As a result, a player would only need to physically reload the blaster every time the physical round hopper is emptied. This will also allow for when a player gets eliminated, their blaster does not fire anymore until a new game starts, they go re-spawn at their base, find an extra life somewhere within the battlefield, or otherwise, or other digital gameplay that is utilized during that game or round. It will be appreciated that there can be multiple scenarios where a player may not be able to use their blaster. For example, in a preferred embodiment of the invention, the system may allow the ability to download different environments (e.g., AR/VR/XR environments) that can be used during gameplay. For example, the environments can include jungles, old west, ships, snow, cities, historic, world monuments or movie, comic book and other related themes (e.g., Star Wars, Marvel, Harry Potter, etc.). These environments may provide reasons or the ability to turn off blasting or provide other features within the system gameplay. For example, in a Harry Potter-related environment, there may be a spell or the like that can be "cast" and prevents all the other teams blasters or weapons from working. In a Star Wars environment, the blaster or other handheld item or weapon may become a lightsaber.

Any type of AR/VR/XR system or eyewear is within the scope of the present invention. For example, the system may connect or combine with Apple's (or others') AR glasses. The use of AR/VR/XR eyewear and the connection to the system, app, etc. may provide for abilities or features for players or participants. For example, the eyewear may provide the ability to see where your teammates are through walls, around buildings, etc. The eyewear may provide the ability to see the health being lost by another participant as you shoot them, and/or see your own health stats at all times or as you are hit. Motion tracking or sensing components, sensors or reflectors on the blaster or other items allow the game to replace the look of the physical blaster or other item in the players hand. In other words, if a player has a pistol in the game, the player (and other players) will see a pistol in the AR/VR/XR eyewear and when the player upgrades to, for example, a bazooka, the gun will graphically change on the screen (e.g., similar to a first person shooter game). For example, the virtual gun shown in AR/VR/XR on the eyewear can change from a pistol to a machine gun when the player upgrades to that gun. The eyewear preferably provides the ability to see and go get supply drops (e.g., weapons, health kit, shield, potions, etc.) in the physical world (e.g., around the yard, playing area, arena, etc.). Accelerometers, gyroscopes or other motion sensing devices can be included on or within the blaster or other physical item to track movement that can be digitized and displayed on the AR/VR/XR eyewear or on the app.

In a preferred embodiment, the battlefield environment provides inflatable or other barricades that are associated with the game (and may be wirelessly connected within the game or gaming session) look like other objects in the game that a player is hiding behind. For example, an inflatable wall may look like a rock wall in AR/VR/XR. QR codes can be used on the barricades and any other object within the game for tracking purposes. The eyewear preferably shows different "skin" or outfit in the game based on your team, your personal preferences, what skins you own or have earned, etc. The wearables may include QR codes or other motion trackers for improved tracking performance.

In a preferred embodiment, the AR/VR/XR eyewear provides the ability to find virtual shields, first aid kits, better weapons, ammo, treasures, extra lives, etc. at predetermined locations (e.g., laying on the ground, on a barricade or other object). For example, the player sees an object, such as an ammunition magazine in the eyewear at a distance and has to move to the predetermined location to obtain the magazine. Once the system determines the player is at the proper location (e.g., via UWB, magnetometer, GPS, WiFi, etc.), the player obtains the extra ammunition for use in the game. The system preferably provides the ability to create or have a shield around the player so that another player cannot shoot them (the other player's gun may not be able to fire). This can be done via location services and magnetometer data to know someone is pointing at a shielded area and then prevent their blaster from firing.

In an embodiment, a mobile device, such as an iPhone, can be mounted on the side or other location on the physical blaster to allow certain of the system features discussed herein. This can be a version of the system that does not include AR/VR/XR eyewear. Many features described herein can be done without the eyewear. For example, the system connection between the app (via a mobile device on and/or connected to the blaster) can provide the system with features such as app controlled firing, earning of experience and health points, other health kit data, sensing or determination of proximity when firing (i.e., how hard the player is hit by the projectiles), etc. Any or all of the features described herein can be used together to provide a software application experience without the use of AR/VR/XR eyewear.

The system may include an accompanying PC/Mobile/Console game. For example, the applicant may partner with a game like Fortnite or one or more video games can be created or developed that accompany or can be used with the system. Any of the items described herein can be sold or provided as a kit or unit. For example, a gameplay kit can include a number of blasters, inflatable bases and/or barricades, grenades, ammunition, magazines, AR/VR/XR eyewear, downloadable app and/or game that are all sold as a unit. Modules that include components that allow connectivity to or within the system can also be sold or provided. The modules can connect or otherwise attach to items such as blasters. This allows the blaster to be used without being connected to the system (without the module) or within the system. For example, a module can be added to a blaster and a mobile device with software (e.g., a phone with an app) can be secured to the module such that the blaster can be used within the system. In another embodiment, the blaster can include the software and/or app and the necessary connectivity, etc. built therein.

Players may earn experience points (XP) in the system and game by playing outside and entering physical world tournaments. For example, the XP can be earned based on length of playing time or based on points earned on better or worse game play.

An embodiment can include remotely controlled blasters that are included at each teams' base that can be controlled by someone in a different location via the game/system/app (camera and computer controlled firing versus the opposing team).

An embodiment can include players remotely piloting drones that shoot projectiles (e.g., Gel Blaster cannons) or other shooting device and that can attack the other team remotely utilizing a computer or mobile device.

In a preferred embodiment, the system can include features, components or elements for collecting and/or monitoring health data. For example, the system can connect or otherwise be associated with Apple HealthKit, Google Health or other systems to track calories burned while playing, monitor heart rate or determine other health data. In a preferred embodiment, the calories burned and other health data can be used for gamification. For example, the system can include daily, weekly and/or monthly contests for longest/highest game play and calories burned to earn XP. The digitization of the game play experience allows for community tournaments, neighborhood tournaments, teams, monthly contests, leaderboards, etc. In a preferred embodiment, the system includes the ability to broadcast any of the gameplay via cameras mounted on the players or their equipment (e.g., the eyewear) or by connecting to the feed that is broadcast on any or all of the player's AR/VR/XR eyewear or the app. This allows games to be broadcast or streamed on television, computers, Twitch, Youtube, etc., thereby allowing for a sport, television show, channel, etc. to be based around gameplay, tournaments, etc.

The system can also include remotely operated explosives (e.g., a C4 looking Gel Ball bomb) and inflatable smart forts for each team. The forts or other location/structure may include the ability for the other team to "defeat" or finish the fort. For example, the fort can include sensors or the like so that when the other team shoots a predetermined location or area on the fort (e.g., a "death star hole") enough times it will cause the inflatable fort/base to deflate.

The system may include built in speed loading of gellets or other projectiles. The system can include the ability to digitally dispense or load ammunition. A smart ammo dispenser may be based on predetermined parameters within the gameplay. For example, a game may be set where players can only refill a certain number of times during the length of the game and after they have reached the limit the system prevents the player from reloading (e.g., locking the canister, stopping the blaster from working, etc.). The right to refill may be earned and the blaster may begin working again.

In a preferred embodiment, the module or other digitally related components of the present invention may be connectable to the power of the blaster. For example, the blaster may include leads or a jack that provides power to the external item (such as a module). This allows a module or other system related component to be retrofitted on a blaster or other similar device that includes a power source. This can provide power so that the direction sensing capability, localization, magnetometer, wideband, IR reader and/or reflector and other components can be powered. The wearable can also include infrared (IR) reflectivity that works or is operatively connected to an IR reader on gun so that the system can sense what player is shooting another player and to provide other capabilities. The system can also provide connection so that other powered accessories (e.g., projectile velocity changer) on the blaster or the barrel thereof can be operated. For example, if a player earns a higher rate of fire or a higher velocity during gameplay, the system can provide instructions (via connectivity) to move or change something mechanically or physically on the gun (e.g., slide a sleeve) to provide the higher velocity projectile firing.

The system may include projectile firing devices, such as sniper rifles, that only work in certain areas or predetermined locations in the field of play. For example, the player may earn a "large sniper rifle" within the game, but the rifle can only be used from a designated location (e.g., a certain hill). In use, based on the system sensing the location of the player the rifle cannot be fired unless the player is in a predetermined location (e.g., on the hill).

It will be appreciated by those of ordinary skill in the art that the present invention allows or provides for the incorporation of elements of arena survival video games into a mixed-reality AR/VR/XR environment. In a preferred embodiment, the system includes guns/blasters that include the capability of connecting to a mobile device that includes an app thereon. In a preferred embodiment, the system includes the ability for players or users to "level up" based on outside playing time, etc. Leveling up can include actions such as the ability to obtain better equipment (e.g., guns, ammunition, etc.), and other aspects desired by the player. This can also utilize or connect to exercise related apps or devices (e.g., Apple Watch, Fitbit, etc.). In a preferred embodiment, the system includes wearables that have sensors or the like thereon that can determine when it is struck. This may include capacitive indicator(s) on the wearable and communication/connectivity to a processor that provides feedback on AR eyewear/glasses or the equivalent. The vest or other armor can also provide sensing of the proximity of a shooter based on impact of the projectile.

In a preferred embodiment, the blaster includes one or more holes or openings that are auto-adjusted to modify feet-per-second of gel and communication/connectivity to AR interface for different types and levels of blasters. In a preferred embodiment, the system includes Bluetooth or other wireless connectivity between elements of the system that are not physically connected (i.e., vest, glasses, blaster, etc.). Any of the elements or components of the system described herein can be wirelessly connected (or wired). Any of the physical items, e.g., barricades, magazines, forts, bases, wearables, blasters, eyewear and the like can include connectivity to the system.

In a preferred embodiment, the system includes location or other proximity based features (e.g., so a player can see the location of teammates, for providing higher assessed damage based on how close the shooter is to the target, the type of blaster). In a preferred embodiment, the system includes a heads-up-display in AR glasses with mixed reality to accommodate data from vest/blaster and other connected components while engaging with the real, physical environment simultaneously. It will be appreciated that the system can also be utilized for applications in law enforcement, military, training, hunting and other shooting or physical scenarios.

In accordance with a first aspect of the present invention there is provided an extended-reality projectile-firing gaming system. The system includes a projectile-firing device that includes a projectile repository configured to carry projectiles for firing, a battlefield object configured to detect impact of projectiles thereon, a network configured to provide communication and control connectivity in accordance with at least one protocol to the projectile-firing device and the wearable device, and an extended-reality gaming application. The gaming application is configured to control the projectile-firing device and the wearable device in accordance with a gaming session having a gameplay configuration for providing an extended-reality environment, receive projectile-firing device data from the projectile-firing device, the projectile-firing device data indicating that a projectile was fired and the time the projectile was fired, receive battlefield object data from a battlefield object, the battlefield object data indicating that an impact occurred on the battlefield object, and the time the battlefield object was impacted, update gaming metric data to indicate a successful impact of the fired projectile on the battlefield object and a successful hit by the projectile-firing device on the battlefield object when the time the impact occurred on the battlefield object and the time the projectile was fired occur within a predetermined time period.

In an embodiment, the battlefield object may be a wearable device.

The updated gaming metric data may be further configured to receive a location and orientation of the projectile-firing device, wherein the extended-reality gaming application records a successful impact of the fired projectile on the battlefield object and a successfully fired projectile by the projectile-firing device associated with the battlefield object when the location of the projectile-firing device is within a predetermined range from the battlefield object and the orientation of the projectile-firing device is aligned at a predetermined area associated with the battlefield object.

The extended-reality gaming application may be further configured to track user scores and skill improvements in accordance with the gameplay session. The system may further include a target configured to detect impact of projectiles thereon.

In a preferred embodiment, the extended-reality projectile-firing gaming system includes an extended-reality device configured to provide computer-aided vision for display of real and virtual objects and a computer-aided interface for interaction with the real and virtual objects. The extended-reality device may include a heads-up display configured to display information corresponding to the gaming configuration and the updated gaming metric data. The system may further include a virtual extended-reality object in accordance with the gameplay configuration and configured to be viewable through the extended-reality device.

The extended-reality gaming application is preferably configured to provide commands and instructions via the network in accordance with the gameplay configuration to at least one of the projectile-firing device and the battlefield object.

The system may further include a remote device configured to receive data via the network from at least one of the projectile-firing device and the battlefield object. The remote device may be configured to be affixed to the projectile-firing device and provide at least one of near-field communication, radio frequency, infrared, magnetometer, and global positioning satellite sensory data to the extended-reality gaming application.

The gaming configuration preferably includes information corresponding to at least one of a game mode, a health meter, a shield meter, a projectile tally, a projectile repository tally, a rate of fire, a reload interval, a virtual power up, a success tally, a failure tally, a success to failure ratio, an alert, a battlefield role, a team affiliation, a battlefield objective, and a set of battlefield parameters.

In a preferred embodiment, the projectile-firing device is configured to receive instructions and commands to control one or more of an amount of projectiles available for firing, a predetermined velocity of the projectiles for firing, a predetermined rate of fire of the projectiles, and a predetermined reload interval of the amount of projectiles.

The extended-reality gaming application may be configured to increase or decrease the predetermined velocity in accordance with the gameplay configuration. In addition, or alternatively, the projectile-firing device is configured to increase or decrease a predetermined velocity at which the projectile-firing device is configured to fire the projectile in accordance with the gameplay configuration.

In a preferred embodiment, the projectile-firing device comprises a display. The system may include a non-wearable device configured to communicate via the network with at least one of the projectile-firing device and the battlefield object and detect impact of projectiles thereon.

In a preferred embodiment, the extended-reality gaming application is configured to provide virtual extended-reality real-time or near real-time overlays in accordance with the extended-reality environment.

In accordance with another aspect of the present invention, there is provided an extended-reality projectile-firing gaming method. The method includes initiating a gaming session having a gameplay configuration for providing an extended-reality environment, the gaming configuration comprising gaming metric data configured to track at least scoring during the gaming session, providing commands and instructions via a network configured to communicate with and control one or more of a projectile-firing device and a battlefield object in accordance with at least one protocol, receiving projectile-firing device data from the projectile-firing device, the projectile-firing device data indicating that a projectile was fired and the time the projectile was fired, receiving battlefield object data from a battlefield object, the battlefield object data indicating that an impact occurred on the battlefield object, and the time the battlefield object was impacted, updating the gaming metric data to indicate a successful impact of the fired projectile on the battlefield object and a successful hit by the projectile-firing device on the battlefield object when the time the impact occurred on the battlefield object and the time the projectile was fired occur within a predetermined time period.

In a preferred embodiment, the method further includes receiving a location and orientation of the projectile-firing device, wherein the gaming metric data is updated to indicate the successful impact and the successful hit when the location of the projectile-firing device is within a predetermined range from the battlefield object and the orientation of the projectile-firing device is pointed at a predetermined area associated with the battlefield object.

The method may further include receiving a location and orientation of the battlefield object, wherein the gaming metric data is updated to indicate the successful impact and the successful hit when the location of the battlefield object is within a predetermined range from the projectile-firing device and the orientation of the battlefield object is oriented toward the orientation of the projectile-firing device.

The method may further include receiving target data from a target configured to detect impact of projectiles thereon. The method may further include receiving commands and instructions from at least one of the projectile-firing device and the battlefield object at a remote device and displaying information corresponding to the commands and instructions on the remote device.

The method may further include receiving extended-reality device data from at least one extended-reality device configured to provide computer-aided vision for display of real and virtual objects and a computer-aided interface for interaction with the real and virtual objects.

The method may further include controlling one or more of an amount of projectiles available for firing, a predetermined velocity of the projectiles for firing, a predetermined rate of fire of the projectiles, and a predetermined reload interval of the amount of projectiles. The method may further include adjusting the predetermined velocity in accordance with the gameplay configuration.

In accordance with another aspect of the present invention, there is provided an extended-reality projectile-firing gaming method. The method includes receiving projectile-firing device data from a projectile-firing device comprising a projectile repository configured to carry projectiles for firing, receiving battlefield object data from a battlefield object configured to detect when the battlefield object has been impacted by a projectile fired from the projectile-firing device, confirming an impact of the fired projectile on the battlefield object, recording a time of the impact of the fired projectile on the battlefield object, recording a time of firing of the fired projectile associated with the projectile-firing device, recording a successful impact of the fired projectile on the battlefield object and a successfully fired projectile from the projectile-firing device when the time of the impact on the battlefield object and the time of firing of the fired projectile occur within a predetermined time period, and updating gaming metric data comprising the successful impact and the successfully fired projectile.

The method may further include receiving a location of the projectile-firing device, wherein the successful impact and the successfully fired projectile are recorded when the location of the projectile-firing device is within a predetermined range from the battlefield object at the time when the fired projectile was fired.

The method may further include receiving an orientation of the projectile-firing device, wherein the successful impact and the successfully fired projectile are recorded when the orientation of the projectile-firing device is pointed at a predetermined area associated with the battlefield object at the time when the fired projectile was fired.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
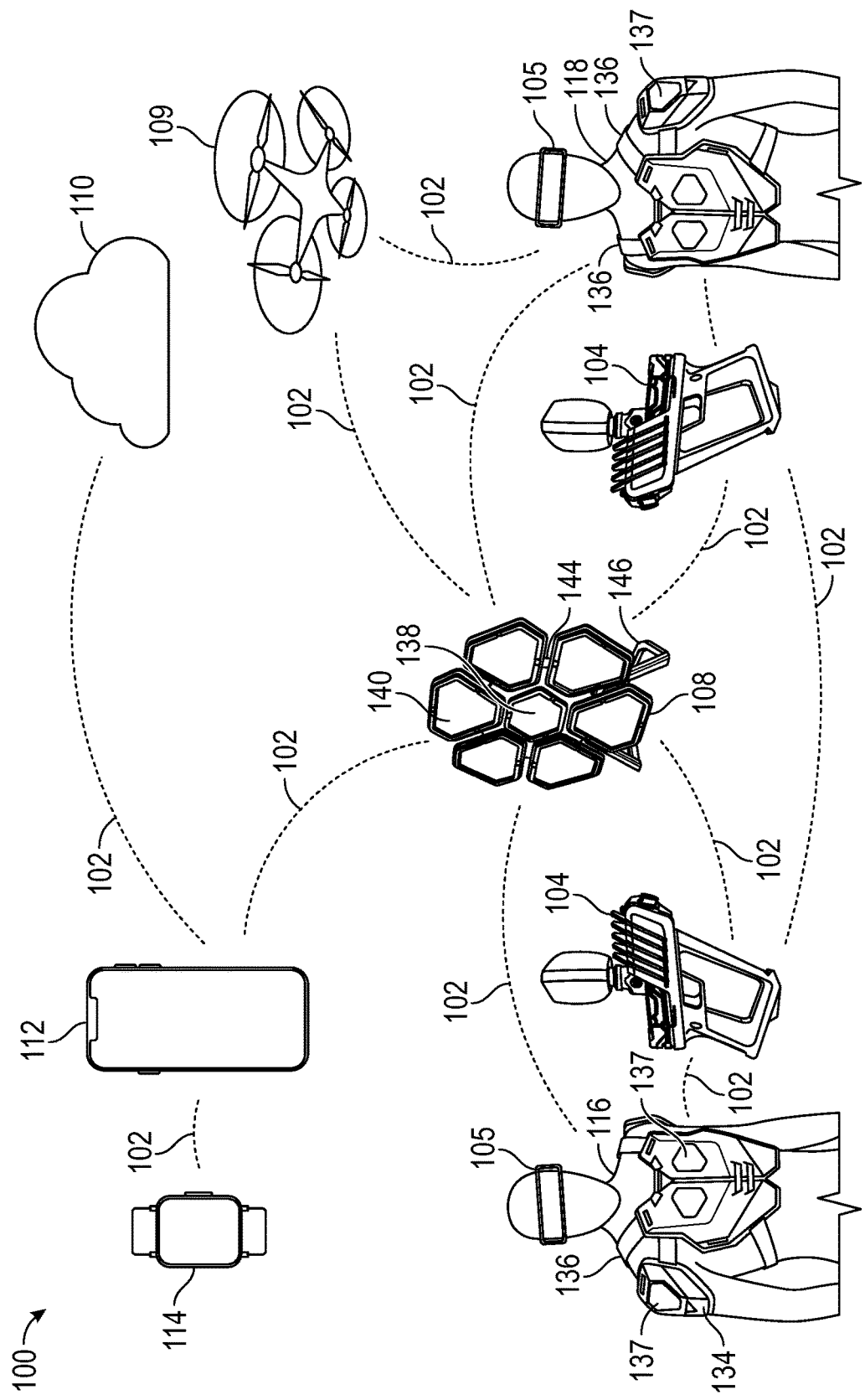
FIG. 1 is a diagram of an extended-reality projectile-firing gaming system in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms.

The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 7:
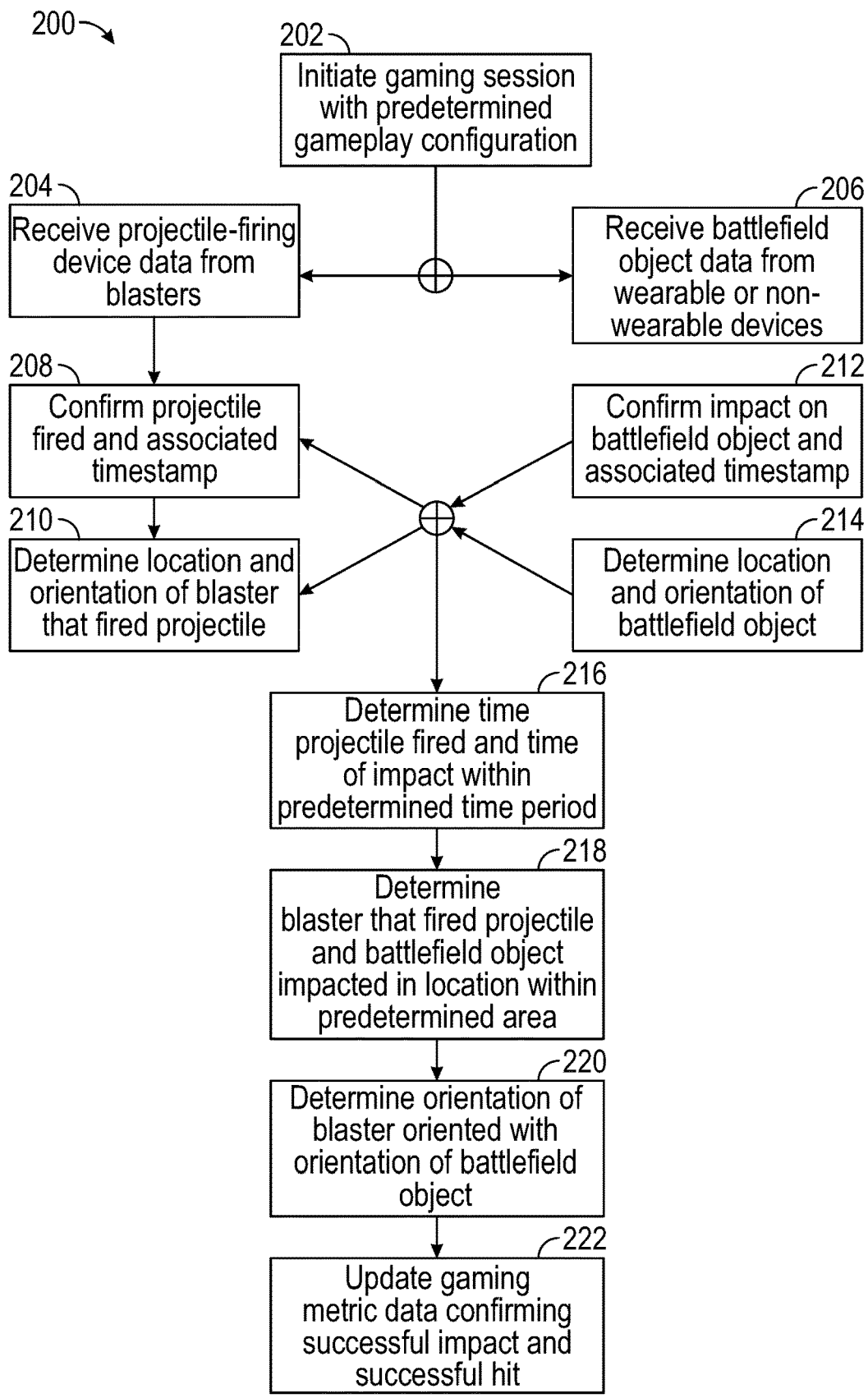
FIG. 7 is a flow diagram of an extended-reality projectile-firing gaming method in accordance with a preferred embodiment of the present invention.
Figure 8:
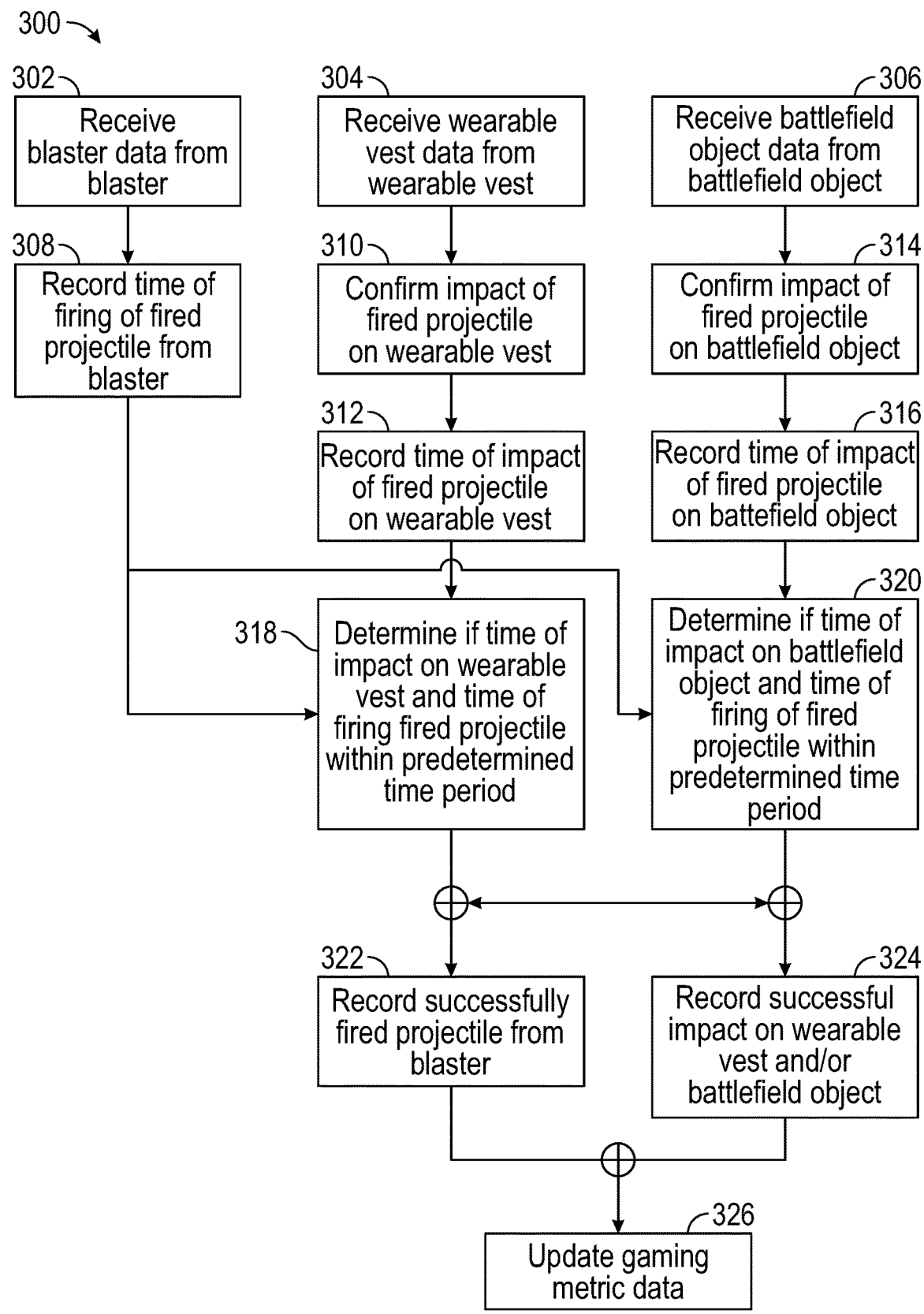
FIG. 8 is a flow diagram of an extended-reality projectile-firing gaming method in accordance with a preferred embodiment of the present invention.

Referring now to the drawings, which are for purposes of illustrating the present invention and not for purposes of limiting the same, the drawings show devices and components (and related methods) therein in accordance with preferred embodiments of an extended-reality projectile-firing gaming system and method. As shown in FIGS. 1-6, the extended-reality projectile-firing gaming system generally includes a system of wirelessly interconnected blasters, targets, wearables, and "battlefield" objects that allow players to engage in precisely tracked and managed projectile sports and games, resulting in an experience of "Video Games Outside". As shown in FIGS. 7-8 extended-reality projectile-firing gaming methods are shown, further illustrating preferred methods for attributing scoring to particular players or users of the extended-reality projectile-firing gaming system.

Referring now to FIG. 1, FIG. 1 is a diagram of an extended-reality projectile-firing gaming system 100 in accordance with a preferred embodiment of the present invention. FIG. 1 depicts two users utilizing a network 102 in connection with the system 100. The system 100 includes a projectile-firing device 104, an extended-reality device 105, a wearable device 106, a standalone target 108, a drone 109, a cloud-based computing system 110, a remote device 112, and a fitness monitoring device 114. The network protocol may include Bluetooth, WiFi, radio frequency (RF), or other suitable network protocol.

The network 102 is configured to utilize one or more network protocols to facilitate communication by and between the various components of the system 100. For example, as disclosed herein, the network 102 may consist of any network type, including but not limited to a local area network (LAN), wide area network (WAN), and/or the internet. One of ordinary skill in the art would understand that a variety of networks and/or network protocols may be implemented to provide connectivity between the various components of the system 100.

Figure 2:
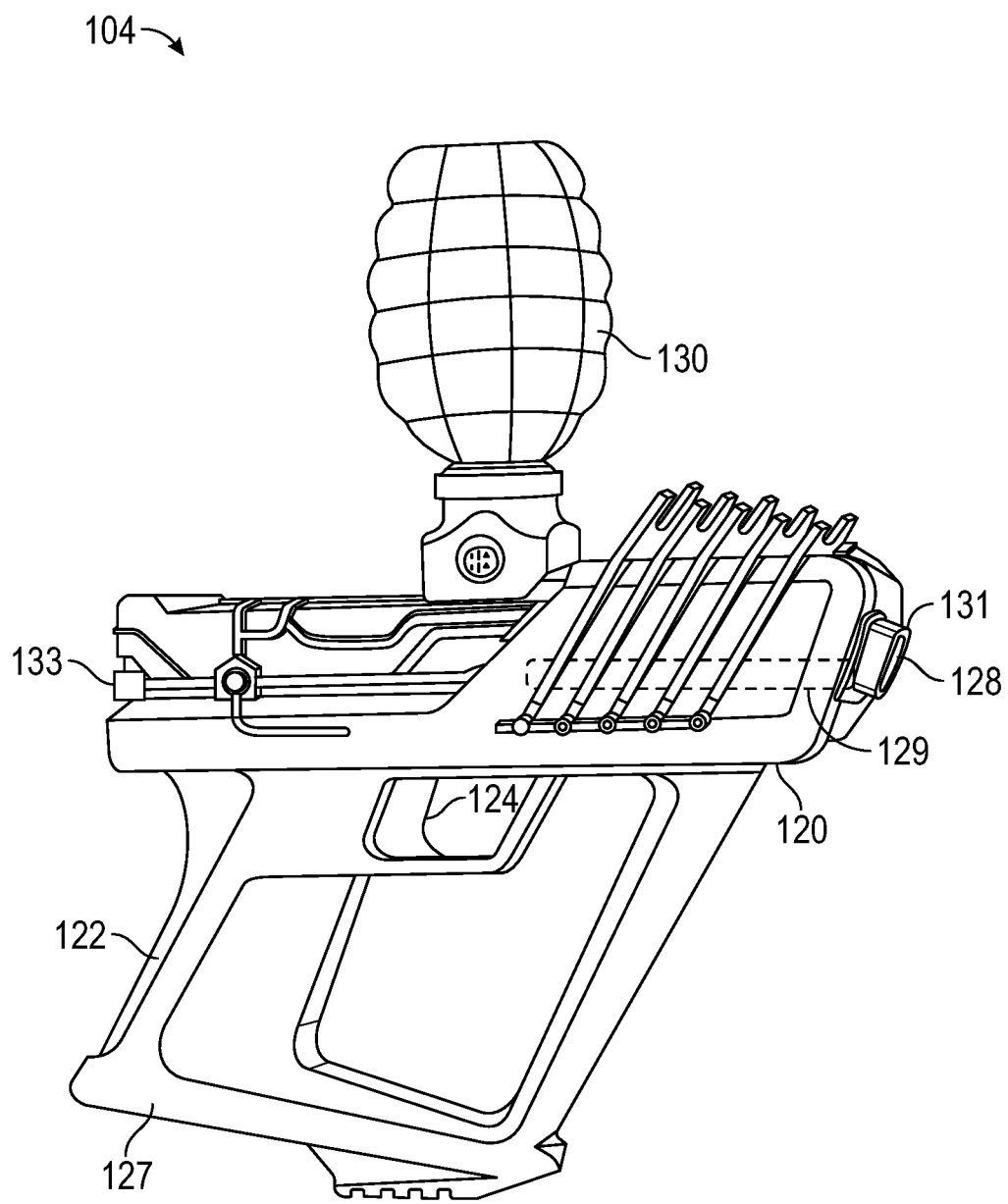
FIG. 2 is a diagram of a projectile-firing device in accordance with a preferred embodiment of the present invention.

Referring to FIG. 1, two projectile-firing devices 104 are depicted. The first projectile-firing device 104 is associated with a first user 116 and the second projectile firing device 104 is associated with a second user 118. One of ordinary skill in the art would understand that more than two devices 104 may be utilized and that the system 100 is scalable to include more than two users 116, 118. FIG. 2 is a diagram of a projectile-firing device 102 in accordance with a preferred embodiment of the present invention. The projectile-firing device 102, in a preferred embodiment, includes a housing 120, a handle 122, a trigger 124, a battery pack 126 (internal to the handle 122 in FIG. 2), a muzzle 128, and a hopper 130. The housing 120 preferably is configured to receive the handle 122, the trigger 124, the battery pack 126, the muzzle 128, and the hopper 130. The housing 120 is also preferably configured to embody electromechanical apparatus to receive commands and/or instructions via the network 102, feed projectiles from the hopper 130 to be fired by the projectile-firing device 104, and mechanically fire one or more projectiles from the muzzle 128. The electromechanical apparatus may include a gearbox configured to load and fire gellets, small biodegradable projectiles configured to be fired from the muzzle 128. The handle 122 is configured to receive the trigger 124 and used by the user 116, 118 to depress the trigger 124 to fire the projectiles from the muzzle 128. When the trigger 124 is depressed by the user 116, 118, the device 104 may be configured to fire a single projectile, or multiple projectiles (e.g., automatic fire mode). In an embodiment, the device 104 includes a switch 133 to change the fire mode from single fire to automatic fire modes. Alternatively, or in combination with the switch 133, the device 104 includes a display 152 (shown in FIG. 4) that is configured to change the fire mode from single fire to automatic fire modes. In an embodiment, the fire mode is configured to fire three projectiles upon the trigger being depressed once by the user 116, 118. The fire mode may also be controlled by the application via the network 102 to vary the fire mode depending upon the gaming configuration in accordance with a gaming session.

The muzzle 128 is configured to permit the projectile from exiting the projectile-firing device 104. The projectile-firing device, in a preferred embodiment, is configured to vary the velocity of a projectile from 90 feet-per-second (FPS) to 170 FPS. In other embodiments, the velocity is configured to reach 200 FPS or greater. For example, the projectile-firing device receives commands and/or instructions from the application via the network 102 to electromechanically adjust the velocity at which the projectile-firing device 104 is fired. The velocity may be adjusted electromechanically through a variety of methodologies, all within the scope of the present invention.

In an embodiment, the electromechanical functionality of the projectile-firing device 104 includes a barrel 129 (shown internally with dashed lines) to be inserted into the muzzle 128 and/or muzzle area. The barrel 129 may be configured to increase or decrease a velocity at which the projectile-firing device 104 fires a projectile. For example, a first barrel 129 is configured to achieve a muzzle velocity of 170 FPS, while another barrel 129 is configured to achieve a muzzle velocity of 90 FPS. Alternatively, or in combination with the barrel 129, a barrel tip 131 is preferably configured to be affixed to the muzzle 128 and/or muzzle area. The barrel tip 131 also may be configured to achieve muzzle velocities within the velocity ranges described herein. In yet another embodiment, the barrel tip 131 may be configured to reduce the velocity from a predetermined "default" range; thus, for example, when the barrel tip 131 is not affixed to the muzzle 128, the velocity is 170 FPS, while when the barrel tip 131 is affixed to the muzzle 128, the velocity is 90 FPS. The barrel tip 131 may be configured to allow beginners or those desiring a less aggressive gameplay experience to lower the velocity. Still further, in any of the aforementioned embodiments, the mechanical components of the muzzle 128, the barrel 129, and the barrel tip 131 may be combined with electronically adjusted velocity increments so as to achieve FPS velocities greater or lower than the predetermined velocities of the mechanical components. Still further, the projectile-firing device 104 may include physically adjustable areas alongside the barrel 129 to open or close to vary the velocity mechanically. In an embodiment, the velocity is decreased when the physically adjustable areas are opened further, while the velocity is increased when the physically adjustable areas are closed further. The opening and closing of the physically adjustable areas may be controlled by the application via the network and/or internal electronic components of the projectile-firing device 104.

Other methods of lengthening or shortening ranges mechanically are within the scope of the present invention. In an embodiment, electronic adjustment of blaster spring tension may be utilized, meaning that certain weapon types can be made to fire physically longer or shorter distances as determined by the system, allowing for "range" as an attribute; e.g., Sniper vs Revolver (e.g., Table 1).

The device 104 preferably includes electronic circuitry, or the like, to provide relatively accurate position and direction of the device 104. This data preferably is utilized to provide confirmation, in connection with the application, of a "hit" by a particular user 116, 118 on another user's 116, 118 wearable device 106 or a particular standalone target 108/monolithic target 148 or other target/battlefield object. The device 104 may also include an IR reader so that the system 100 in connection with the application can sense that a particular device 104 has reflected IR radiation on a wearable device 106 or target for further confirmation of a "hit."

Referring still to FIG. 2, the battery pack 126 is configured to provide power to device 104. For example, the device 104 includes electromechanical apparatus such as internal electronic circuitry configured to be powered by the battery pack 126. The battery pack 126 is also preferably configured to operate mechanical firing apparatus of the device 104. The battery pack 126 preferably is a rechargeable battery pack 126 configured to receive a USB-C input to recharge the battery pack 126. In other embodiments, the battery pack 126 may be recharged by a variety of recharge methods, all within the scope of the present invention, including a mini-USB input, or the like. The device 104 preferably includes a recharge port 127 configured to receive a recharge input.

The hopper 130 preferably is configured to hold a "depot" of projectiles to be fed to the electromechanical apparatus within the device 104 for firing. In various embodiments, the hopper is configured to hold 100, 200, 300, 400, 500, 600, 700, 800, 1000, or greater or fewer projectiles. The gaming configuration in accordance with a gaming session may limit the number of projectiles held by the hopper 130. The hopper 130 is configured to gravity feed projectiles into the device 104.

In a preferred embodiment, the projectile-firing device 104 is configured to uniquely receive instructions and/or commands from the application via the network 102 to increase or decrease electromechanical functionality of the projectile-firing device 104 when receiving "damage," receiving points or "health," or during a variety of other scenarios, preferably in connection with a gaming configuration. The physical consequences of this capability impact the first user's 116 ability to inflict "damage" to the second user 118. As a result, the rate of fire may be increased or decreased, a reload interval may be increased or decreased, a velocity of the device 104 may be increased or decreased, and an amount of "damage" inflicted can be varied depending on the commands and/or instructions, including the type and configuration of the gaming profile (e.g., gaming configuration) that is configured to be set during a gaming session. A projectile-firing device 104, for example, may be set in a configuration as a sniper rifle, a pistol, or a shotgun. Each of these configurations, in a preferred embodiment, are preset with specified rates of fire, reload intervals, damage capabilities, range of fire, or the like. The projectile-firing device 104 set in sniper rifle mode, for example, would have a slower rate of fire, a more frequent reload interval, and a higher damage capability than the projectile-firing device set in pistol mode, for example. The projectile-firing device 104 is configured to be electromechanically controlled by the application via the network 102 such that any of the above configurable options may be varied in real- or near-real-time.

The system 100 in accordance with the application gameplay configuration will allow or disallow the refill or usage of projectiles according to gameplay modes where a "reload" can be physically controlled from electromechanical assembly and connected via the network 102 and given instructions from the application. A projectile dispenser may be based on predetermined parameters within the gameplay and may embody or be part of the hopper 130. For example, a game may be set where the users 116, 118 (e.g., players) can only refill a certain number of times during the length of the game and after they have reached the limit the system prevents the player from reloading (e.g., locking the canister, stopping the blaster from working, etc.). The right to refill may be earned and the blaster may begin working again. In an embodiment, a home base/capture point station 172 may be utilized that permits the users 116, 118 to refill projectiles literally (e.g., within the existing hopper 130), as well as virtually per the game mode (e.g., gaming configuration).

The projectile-firing device 104 is configured to monitor and track the time when a projectile is fired from the device 104, and to provide this information to the application. As described herein, the system 100 is configured to receive the time the projectile was fired and correlate the time with the time a wearable device 106 was impacted by a projectile to determine that the user 116, 118 associated with the wearable device was hit by the user 116, 118 associated with a particular projectile-firing device 104. This methodology achieves benefits above and beyond traditional projectile-firing game systems because it can monitor and track who is responsible for a hit, allowing for more interactive gameplay and immersion.

The device 104 preferably includes a display configured to provide useful game information, such as hits, health, ammo, blaster "type", team alignment, remaining players, etc. The device 104 preferably includes electronic circuitry and a network interface to receive data from the network 102 in accordance with the application and the gaming configuration of that particular gaming session.

Referring again to FIG. 1, two extended-reality devices 105 are depicted, separately worn by and associated with the users 116, 118. The extended-reality devices 105 are configured to communicate via the network 102 with the application. The extended-reality devices 105 may be augmented reality (AR), virtual reality (VR), or extended-reality (XR) devices configured to receive and display data via the network 102 to the users 116, 118. The extended-reality device 105 is configured to enhance game modes and game attributes by mixed and/or augmented reality. Any suitable head-mounted display, including those of Meta Quest or Nreal, now and in the future may be utilized to display relevant game information in heads-up-display (HUD) style, allowing the users 116, 118 to track gameplay configurations, statistics, etc., in a video-game-like manner. For example, the extended-reality device 105 includes a HUD display 142 configured to display current health, ammunition (i.e., projectiles), weapon/blaster/projectile-firing device 104 type, shields, and the like. The HUD display 142 may also display "kills," "deaths," and a "kill/death" and/or success/failure ratio, including a ranking of users taking part in the gaming session. In a gaming session where certain of the users 116, 118 have been eliminated from the gaming session in accordance with the gameplay configuration, the remaining team members and opponents are displayed. In an embodiment, alerts, game start/end, timers, and special game states are displayed. The accuracy of the users 116, 118 may also be displayed as a shots/hits ratio. The HUD display 142 may also include display of the current objectives, game modes, progress, capture/flag/base status/health in accordance with the gameplay configuration. In certain embodiments, the gameplay configuration may utilize battlefield roles (e.g., medic, engineer, tank, sniper, etc.). These roles may include specialized perks and restrictions that may be displayed to the users 116, 118 via the HUD display 142.

Each of these displayable items may also utilize real-time or near-real-time virtual overlays on the battlefield environment displayed through the HUD display 142. For example, health and shield bars, team affiliation, badges, status, role, username, etc. can appear over the users' 116, 118 heads. Battlefield objectives can be highlighted in the distance, and capture or base areas can be defined and shown virtually, object pickups can be described and highlighted, weapon skins can be virtualized and overlaid on the device 104, and team colors, player skins, and other aesthetics can be mapped to human users 116, 118 in real-time or near-real-time. The HUD display 142 may also display zones of special status, such as neutral or safe, which can be virtually displayed on the battlefield environment, and hits, shield depletion, firing, etc. can be displayed as real-time or near-real-time virtual animations. Battlefield objects, skins, the environment, etc. can be themed to match game mode, user preference, and/or brand tie-ins, such as the Marvel Universe, WWII, or Sci-Fi themes. The application can restrict or unlock certain themes, nomenclatures, modes, etc., based upon player progress, preference, or parental controls. For example, realistic weapon terminology, violent descriptions such as "killed," or "bloody" animation effects can be restricted to older players or turned off entirely.

QR code/motion-capture-type patterns can be printed on blasters, targets, and battlefield objects to aid the extended-reality device 105 in overlaying virtualized animations/skins accurately utilizing the HUD display 142.

Referring again to FIG. 1, two wearable devices 106 are depicted. One of ordinary skill in the art would understand that while the wearable devices 106 are depicted as wearable vests, other wearables or body adornments affixed to other parts of the body may be utilized without departing from the scope of the present invention. The wearable devices 106 can have lighting profiles, sounds, and other controlled actions to integrate with gameplay. The first wearable device 106 is associated with the first user 116 and the second wearable device is associated with the second user 118. The wearable device 106 includes a torso portion 132 and a shoulder portion 134. As shown in FIG. 1, the torso portion 132 and the shoulder portions 134 are attached via straps 136. The torso portion 132 and the shoulder portions 134 of the wearable device 106 include wearable device targets 137 configured to detect impacts of projectiles on the wearable device 106. The wearable device targets 136 are in communication with one or more of the device 104, the standalone target 108, the drone 109, the cloud-based computing system 110, the remote device 112, and the fitness monitoring device 114. Each of these components is configured to communicate with one or more of the components of the system 100 via the network 102.

Upon detection of a "hit," the wearable device 106 is configured to send a message via the network 102 to the application indicating that the user 116, 118 associated with the wearable device 106 has been hit by a projectile. As mentioned herein, when the application receives the message that the wearable device 106 has been hit, the application correlates the time the projectile was impacted on the wearable device 106 with a time a projectile was fired by a projectile-firing device 104. The user 116, 118 associated with the projectile-firing device 104 that was correlated with the impact on the wearable device 106 is then credited with a hit against the user 116, 118 associated with the wearable device 106.

The standalone target 108 is depicted as a "flower" arrangement in a preferred embodiment. The standalone target 108 includes a central portion 138 (e.g., "pistil" of flower) and a plurality of outer portions 140 (e.g., "petals" of flower). As shown in FIG. 1, the standalone target 108 includes six outer portions 140, but in other embodiments, the number of outer portions 140 may be greater or fewer than six. Each of the central portion 138 and the outer portions 140 are configured to separately determine whether a projectile has impacted that portion of the standalone target 108. For example, the same target impact methodology is utilized for the wearable device targets 136 and the central and outer portions 138, 140 of the standalone target 108. In accordance with the gameplay configuration, "gamifying" the standalone target 108 may include a requirement to separately "hit" each of the portions 138, 140 in order to credit a gameplay objective. In other embodiments, one or more of the central portion 138 and outer portions 140 are required to be hit in accordance with the gameplay configuration. The standalone target 108 permits a variety of gameplay options and/or objectives, all within the scope of the present invention.

The standalone target 108 is preferably in communication with the application via the network 102 so that real-time or near-real-time data may be provided to the application, and visa versa. For example, upon a hit of the central portion 138 of the standalone target 108, the application may credit a "hit" using similar methodology as that used to credit a "hit" on the wearable device 106. The standalone target 108 may also be configured to include a physical indication (i.e., a red lighted portion) to indicate a hit upon a certain portion 138, 140 of the standalone target 108. In addition, or alternatively, the application, upon receiving data from the network 102, may be configured to provide a virtual overlay on the target displayed on the display of the extended-reality device 105.

Figure 3A:
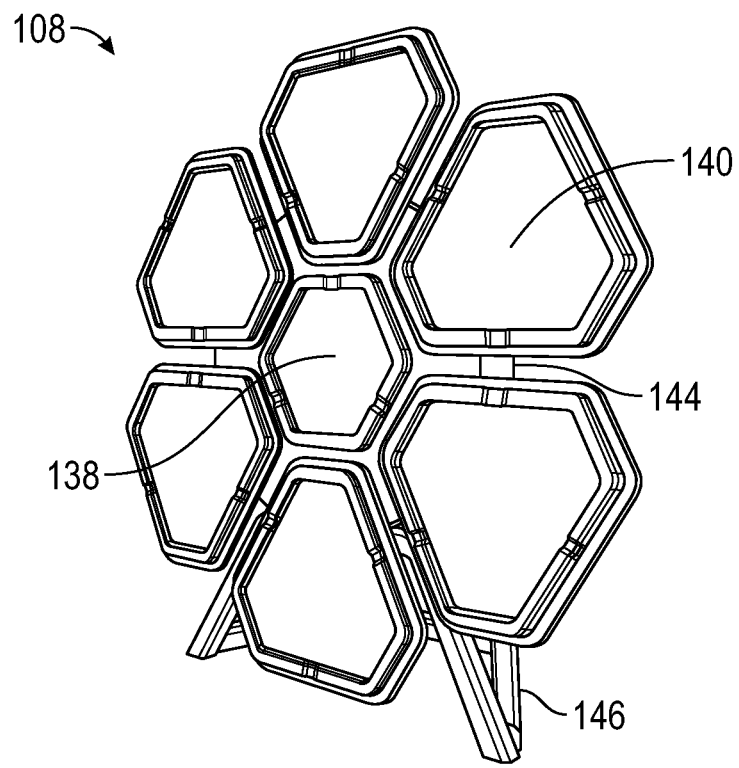
FIG. 3A is a perspective view of a standalone target in accordance with a preferred embodiment of the present invention.
Figure 3B:
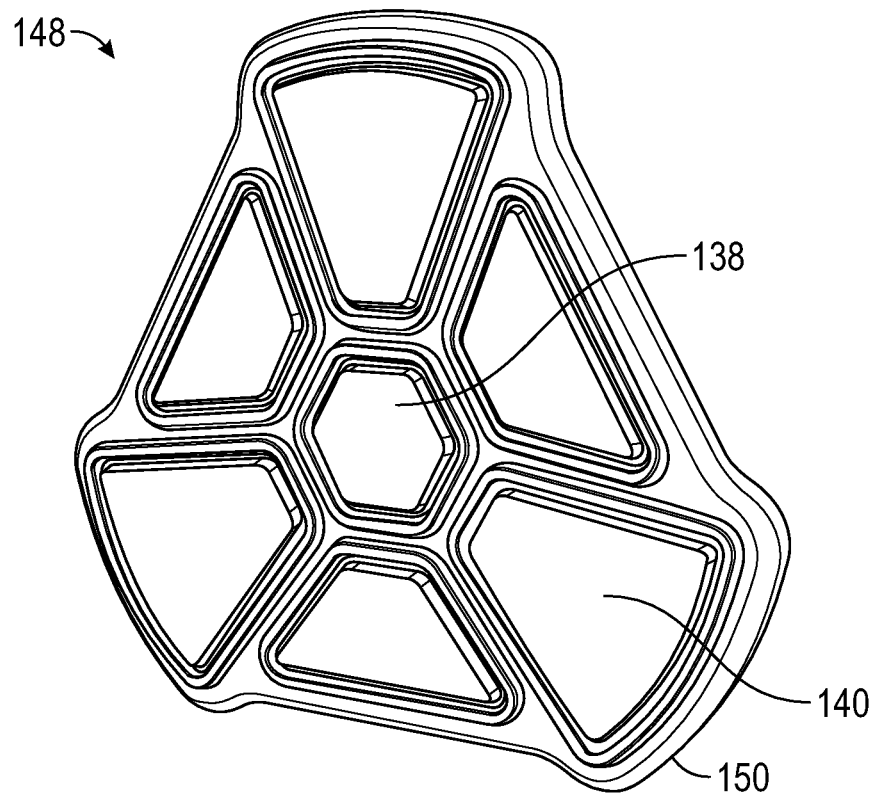
FIG. 3B is a perspective view of a monolithic target in accordance with a preferred embodiment of the present invention.

Referring now to FIGS. 3A and 3B, the standalone target 108 in FIG. 3A is shown in the same configuration as that shown in FIG. 1. The standalone target 108 includes support members 144 to support the central portion 138 and the outer portions 140. The standalone target 108 also includes a stand 146 configured to support the standalone target 108 in an upright position. As shown in FIG. 3B, a monolithic target 148 is shown, which is an alternative configuration of the standalone target 108. The monolithic target 148 includes a similar arrangement including a central portion 138 and outer portions 140, each configured to determine whether a projectile has impacted that particular portion of the monolithic target 148. The monolithic target 148 is constructed so that the central portion 138 and the outer portions 140 are embedded in the same structure (i.e., monolithic construction) or mold 150. The monolithic target 148 may be affixed to a structure such as a barrier or battlefield object, or may be positioned in an upright position using a stand, similar to that shown in FIG. 3A. Similarly to the standalone target 108, the monolithic target 148 is preferably configured to communicate with the application via the network 102, and includes the same "hit" confirmation methodology as that described herein in connection with the standalone target 108 and the wearable device 106.

While specific seven-panel-shaped targets (e.g., standalone target 108, monolithic target 148) have been shown, other shapes or configurations are within the scope of the present invention.

The system 100 as shown in FIG. 1 includes a drone 109. The drone 109 is configured to communicate via the network 102 with the application. The drone 109 may be preprogrammed to provide a "passive" target similar to the standalone target 108 or the monolithic target 148, and/or may be an "active" target or participant preprogrammed to be controlled remotely. In an embodiment, the drone 109 includes a projectile-firing device 104 affixed thereto. One of ordinary skill in the art would understand that the particular projectile-firing device 104 depicted in FIG. 1 would be modified to be affixed to the drone 109.

Referring still to FIG. 1, the cloud-based computing system 110 is configured to provide on-demand availability of computer system resources. The cloud-based computing system 110 preferably includes data storage and computing processor resources to offload storage and processing into a cloud environment. One of ordinary skill in the art would be familiar with cloud-based computing systems and would understand that a variety of configurations of components are within the scope of the present invention. The cloud-based computing system 110 is preferably configured to store and run the application.

The remote device 112 as depicted in FIG. 1 is preferably a smartphone and includes direction-sensing and location-sensing capabilities. For example, the remote device 112 includes GPS and a magnetometer to determine position and direction of the device 112. As disclosed herein, the remote device 112 may be affixed to the projection-firing device 104 to provide relatively accurate position and direction of the device 104. This data preferably is utilized to provide confirmation, in connection with the application, of a "hit" by a particular user 116, 118 on another user's 116, 118 wearable device 106 or a particular standalone target 108/ monolithic target 148 or other target/battlefield object. The remote device 112 may also include an infrared (IR) reader so that the system 100 in connection with the application can sense that a particular device 104 has reflected IR radiation on a wearable device 106 or target (e.g., the targets 106, 148, the drone 109) for further confirmation of a "hit."

The remote device 112 is preferably connected to the network 102 and configured to communicate with the application. The remote device 112 in a preferred embodiment is configured to receive real- or near-real-time data from the network 102 to provide commands and/or instructions to the user 116, 118, and to display the commands and/or instructions thereon in accordance with the gaming configuration for that particular gaming session. The remote device 112 may display useful game information, such as hits, health, ammo, blaster "type", team alignment, remaining players, etc.

The fitness monitoring device 114 as depicted in FIG. 1 is configured to communicate with the application via the network 102. The device 114 may be a smart watch such as Apple Watch and Samsung Gear for integration with additional mobile applications. For example, the device 114 may be configured to integrate with health apps and features via an API. In an embodiment, the users 116, 118 may gain XP or other in-game features through increased physical activity and exertion. Users 116, 118 that exhibit more active gameplay, monitored through the fitness monitoring device 114, may earn increased XP. The users 116, 118 may use the XP to unlock special items, exclusive products, free items, or the like.

As mentioned herein, the application is configured to be stored and run on the cloud-based computing system 110. For example, the application is configured to receive, via the network 102, data from all physical components of the system 100 and stored on a database associated with the cloud-based computing system 110. The application may be configured to receive data from one or more wireless protocols such as Bluetooth (e.g., Bluetooth Low Energy (BLE)), WiFi, RF, etc.). The application preferably is configured to allow the users 116, 118 to download new game modes, receive commands and/or instructions, display score and skill-improvement tracking, and the like. The application may be configured to communicate with the remote device 112 to receive and display this information to the users 116, 118. The application is also configured to provide historical, up-to-date information concerning global and/or local scoreboards, such as those provided in video gaming environments.

The application is also configured, in an embodiment, to provide control over light and/or sound preferences, customized gaming mode/gaming configuration creation or sharing, and the like.

The application, in a preferred embodiment, is also configured to control and communicate with the various targets and physical objects in the system 100 via the network 102. For example, the application is configured to control the start/stop of a gaming session, provide live, real- or near-real-time scoring updates, and visual/audible/haptic user feedback in real- or near-real-time. In accordance with a gaming configuration, the application configures the various components of the system 100 initially in a gaming session setup. Each of the "nodes" within the system 100 is configured to communicate with nearby "nodes" such that the application need only be connected via the network 102 to one other component within the system 100. Thus, sharing and communication of data, information, commands and/or instructions, and the like may be shared between devices, and not necessarily through a "central" hub or routing station.

Figure 4:
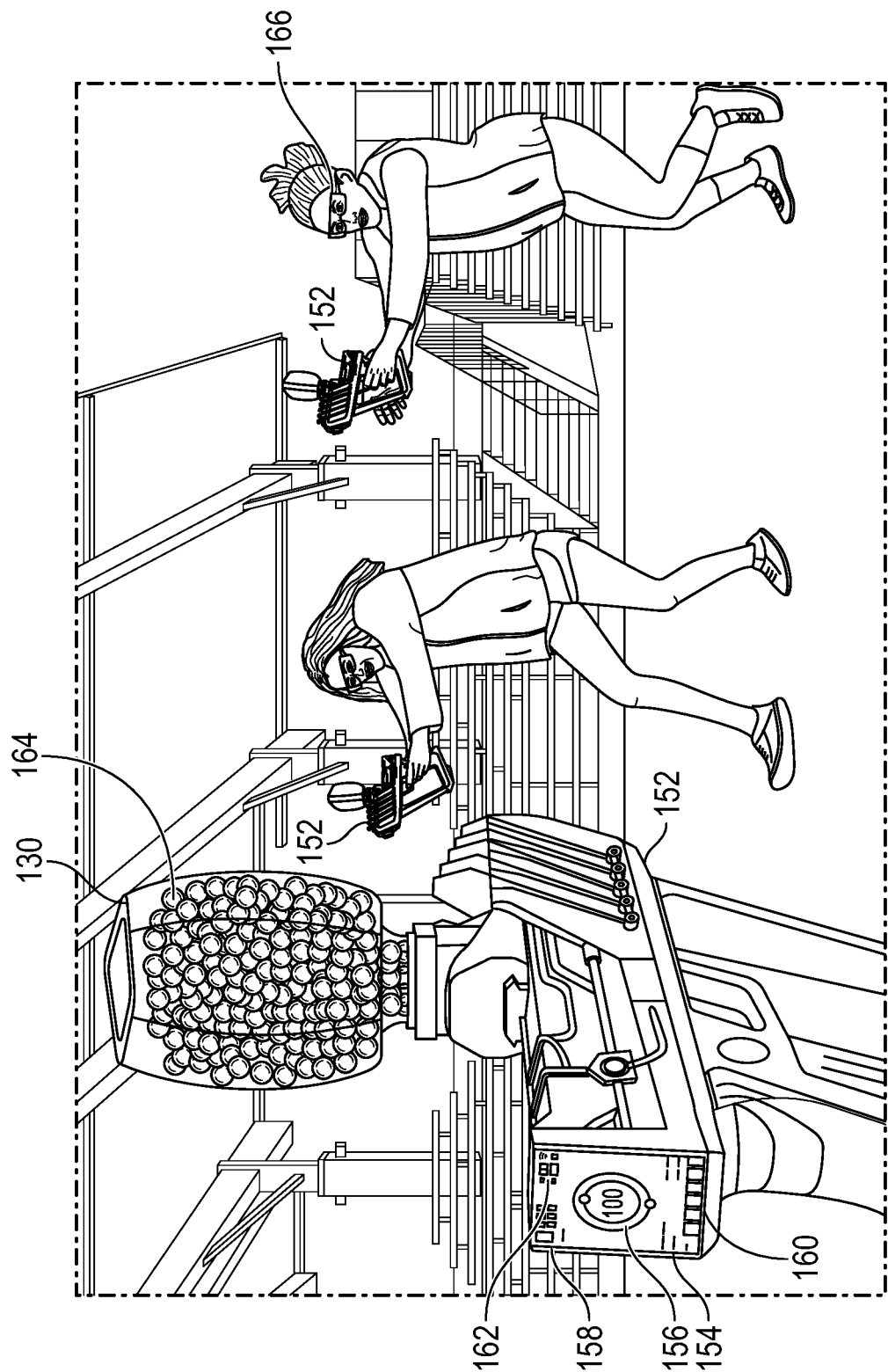
FIG. 4 is a perspective view of a battlefield environment depicting exemplary components of the extended-reality projectile-firing system in accordance with a preferred embodiment of the present invention.

Referring now to FIG. 4, a battlefield environment depicting exemplary components of the extended-reality projectile-firing system 100 is shown. The battlefield environment depicted in FIG. 4 is an outside arena setting showing multiple users 116, 118 each with a projectile-firing device 152. The device 152 is the same or substantially the same as that depicted in FIGS. 1 and 2, but includes a display 154 on the housing 120 facing the user 116, 118. One of ordinary skill in the art would understand that the display 154 may be placed on other areas of the housing 120 without departing from the scope of the present invention. The display 154 is configured to provide useful game information, such as hits, health, ammo, blaster "type" (e.g., projectile-firing device 104, 152), team alignment, remaining players, etc. For example, a health/shield meter 156 depicted in FIG. 4 shows that the user 116 has 100% of the available health points remaining, and a fully available shield. For example, the inner ring depicted on the health/shield meter 156 may signify the remaining health, while the outer ring depicted on the health/shield meter 156 may signify the remaining shield. The upper left corner of the display 154 shows team information 158 including a team affiliation, players on the team, and opponent players. The team information 158 may also indicate that one or more players have been eliminated from game play. The display 154 also includes, on the lower right corner, device information 160, which includes the current weapon type (e.g., SURGE), the firing mode (e.g., semi-automatic, full automatic), the range (e.g., RNG: 4), the damage capacity per round (e.g., DMG: 5), and the number of rounds remaining (e.g., nine rounds). The range, for example, may be determined by a level system wherein a "default" blaster may be given a Level 1 rating. For example, the Level 1 specifications for the blaster may be represented by a single star next to the type of blaster, and include RNG: 4 (out of 10), DMG: 5 (out of 20), set to semi-automatic only, and 9 rounds available per reload. The range may be a limiting range, such that once a blaster fires at a target or user beyond that range, the "hit" will not be credited toward the blaster's user. Alternatively, the range may be a dampening factor such that beyond the optimum range the blaster's damage capabilities is depleted significantly. Through the networked system 100, the application can determine the range at which a device 152 was fired at a target 108, 148 or a user 116, 118, and attribute damage to the user associated with that particular device 152 based on the distance between the device 152 and the target 108, 148 or the user 116, 118.

Through gameplay, upgrades to the blaster level can be acquired in addition to other blaster types. Upgrades may increase the range, damage, and rounds available of a given blaster type. Other blaster types such as "shotguns" could be picked up, and would have specifications balanced differently, such as very high damage ceilings, reduced range ceilings, and varying round capacities.

The display further includes, on the upper right corner, power/connectivity information 162, which includes icons representing, for example, WiFi and Bluetooth signals, remaining device power, etc. In this embodiment, both the WiFi and Bluetooth protocols are utilized to provide the network 102.

The device 152 depicted in FIG. 4 also shows a hopper 130 with projectiles 164 therein. As described herein, the projectiles 164 may be gellets, paintballs, or any other type of projectile suitable for gameplay. The users 116, 118 depicted in FIG. 4 are shown wearing glasses 166. The glasses 166 may be simple safety glasses, or in an embodiment, may be extended-reality devices 105.

Figure 5:
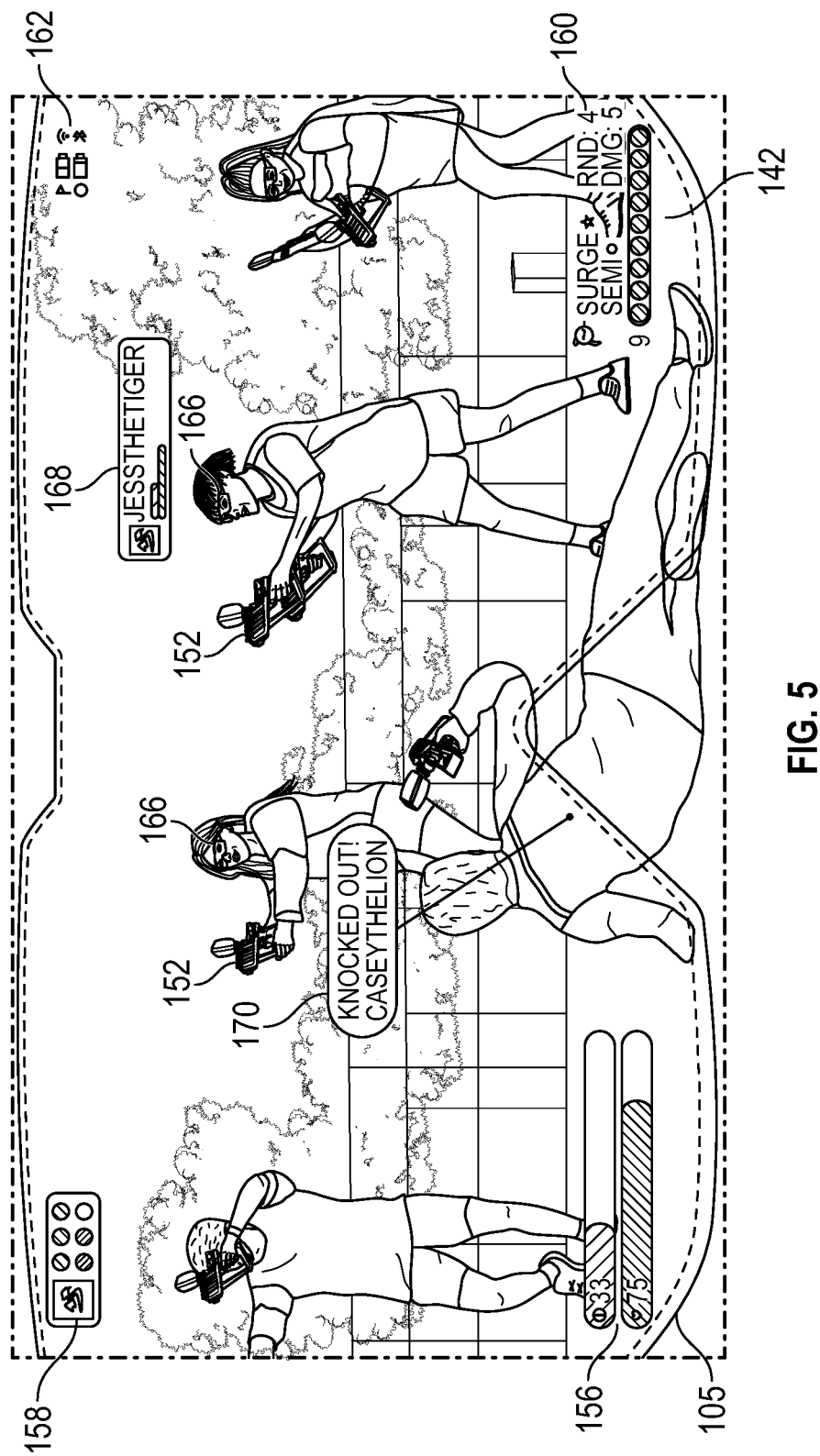
FIG. 5 is a perspective view of a mixed-reality battlefield environment depicting exemplary components of the extended-reality projectile-firing system in accordance with a preferred embodiment of the present invention.

Referring now to FIG. 5, a mixed-reality battlefield environment depicting exemplary components of the extended-reality projectile-firing system 100 is shown. FIG. 5 depicts a first-person view looking through an extended-reality device 105. As shown, the extended-reality device 105 includes the HUD display 142 through which both real-world physical objects such as the users 116, 118, trees, and ground are viewable, as well as virtual objects such as the health/shield meter 156, the team information 158, the device information 160, and the power/connectivity information 162. FIG. 5 also includes player information 168 displayed in a pop-up style banner above the user 116, 118. For example, as shown in FIG. 5, the player information 168 identifies the name of the player (e.g., JESSTHETIGER), the player's affiliation (e.g., shown by the icon to the left of the player's name), and the player's health/shield meter 156 within the pop-up banner. FIG. 5 further includes an in-game message 170 configured to provide the user 116, 118 associated with the extended-reality device 105 information about the gaming session. For example, as shown in FIG. 5, the user 116 identified as "CASEYTHELION" is shown to be "KNOCKED OUT!", indicating that the user 116 has been eliminated from gameplay. Other information and/or data, as described herein, may be displayed to the users 116, 118 through the HUD display 142 without departing from the scope of the present invention.

Figure 6:
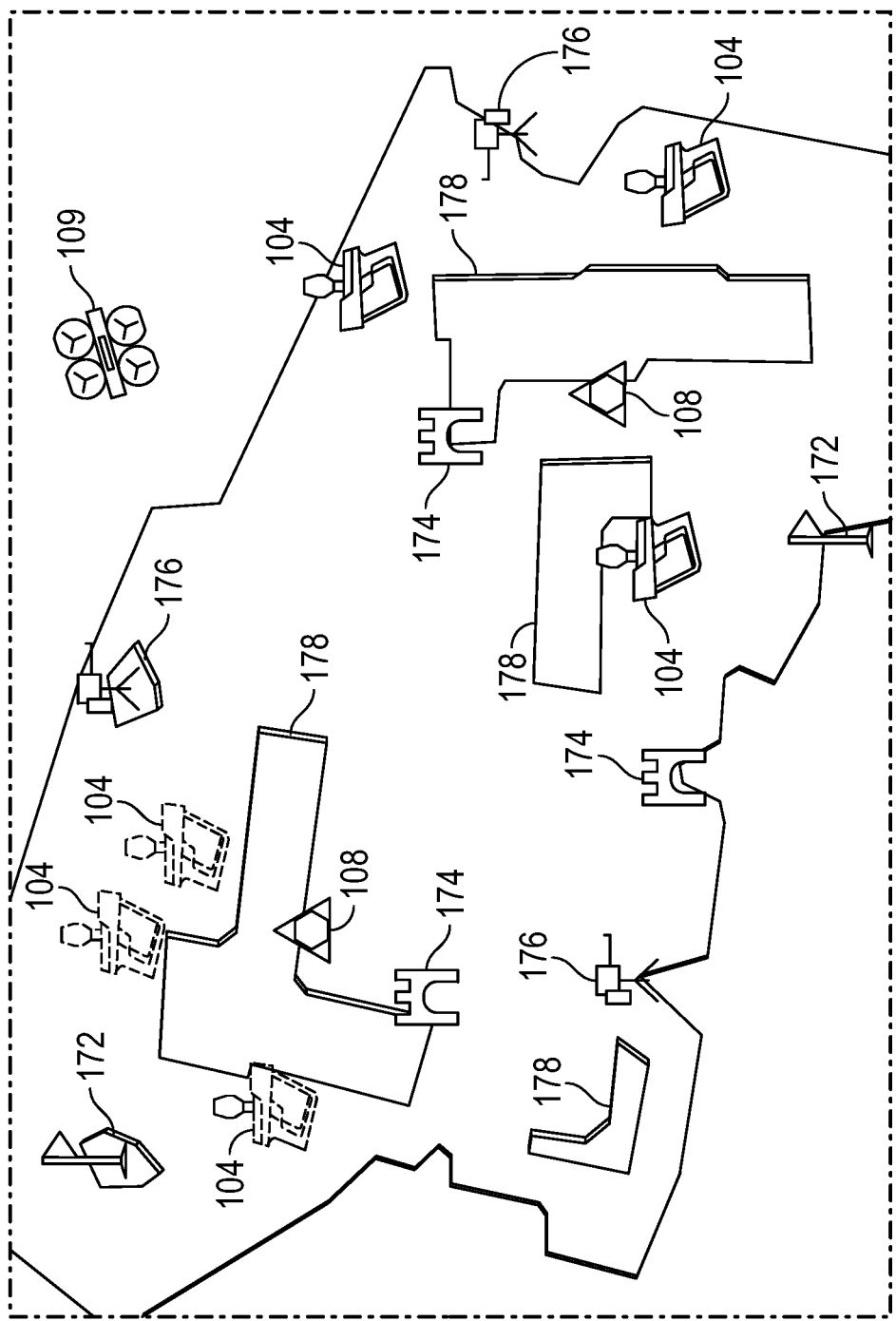
FIG. 6 is a top-down view of a battlefield environment depicting exemplary components of the extended-reality projectile-firing system in accordance with a preferred embodiment of the present invention.

Referring now to FIG. 6, a top-down view of a battlefield environment in accordance with an exemplary extended-reality projectile-firing system 100 is shown. The various components depicted in the battlefield environment of FIG. 6 include projectile-firing devices 104, 152 (e.g., blasters), standalone targets 108 (or monolithic targets 148), a drone 109, home base/capture point stations 172, bunkers 174, turrets 176, and barriers 178.

As described herein, the projectile-firing devices 104, 152 are each associated with a user 116, 118 (not shown in FIG. 6). The user 116, 118 preferably is associated with an extended-reality device 105, a wearable device 106 (e.g., wearable vest), a remote device 112 (e.g., a smartphone), and a fitness monitoring device 114. In addition to these components, a user 116, 118 may utilize physical player-borne shields, designed to shield or deflect projectiles 164. These could be provided to certain "roles" (e.g., Tank, Heavy), or picked up on the battlefield. An iteration of this device could have a collapse/expand function, so that it only activates under certain game conditions, or for certain time intervals with a recharge period, but can be equipped during the whole game.

Each of these components are capable of being in communication with the application via the network 102, as described more fully herein. Not all components associated with the user 116, 118 must be operatively connected to a "central" routing station, but may communicate data with nearby elements, associated with the user 116, 118, another user 116, 118, or any of the networked components described herein. For example, the standalone targets 108, the drone 109, the home base/capture point stations 172, the bunkers 174, and the turrets 176 are all configured to be in communication with the network 102.

The battlefield environment of FIG. 6 depicts two teams or "sides", each comprising three users 116, 118 (e.g., players). The first team comprises three players on the eastern (right) side of the battlefield, while the second team comprises three players on the western (left) side of the battlefield. On the first team's side of the battlefield, a standalone target 108 is associated with the first team. Thus, in an embodiment, one objective of the second team is to eliminate the standalone target 108 on the first team's side. For example, the target 108 may require a team to inflict damage or cause a certain number of hits to win, to unlock bonuses, "debuff" the enemy team, or as a target training game mode. Debuffing an opposing team may include reducing the team's rate of fire, reload times, number of health points, reduce shields, or a variety of other reduction methodologies. The debuff may be configured to be on a timer, such that when the timer expires, the debuff is removed.

In addition, the first team's side includes a drone 109 (which may or may not be associated, or on the same team, as the first team; i.e., neutral, or otherwise), a home base/capture point station 172, two bunkers 174, a turret 176, and two barriers 178. The second team's side includes a standalone target 108, a home base/capture point station 172, a bunker 174, two turrets 176, and two barriers 178. All of these battlefield components may be networked via the network 102 and configured and controlled by the application.

A battlefield objective may include "capturing" the drone 109 to bring it onto the first team's side or the second team's side. The drone 109 may include a projectile-firing device 104 mounted and independently remotely controlled by an operator or user 116, 118. The drone 109 may include a kit enabling attachment of a projectile-firing device 104, a standalone target 108, or the like, to an existing drone platform. In an embodiment, the drone 109 may be integrated with these components and provided as an integrated unit.

If risk of physical damage to the drone 109 is a factor, actual projectile firing could be disabled when the projectile-firing device 104 (e.g., a blaster held by a user 116) is aimed at the drone 109, counting as being "shot down" when the trigger is depressed while aimed at the drone 109. The drones 109 may be configured to be "unlocked" as a perk for accomplishing certain objectives. The drones 109 may have certain automated features, allowing them to fly patterns remotely, such as hovering over the home base/capture point station 172 acting as defense, or following a given player, such as in certain video games. The drone 109 may be configured to execute "air strikes," to be unlocked and called in, where the drone 109 takes off automatically and goes to a point or target, takes an action such as blasting it, and then flies back to a preset location.

While the drone 109 is shown in FIG. 6, other mobile platforms such as rovers or other motorized objects may be utilized for enhanced gameplay. For example, the motorized objects may implement navigational controls, live streaming video, control of projectile-firing devices 104 installed onto the motorized objects, and hit detection and correlation in connection with standalone targets affixed to the motorized objects.

In an embodiment, the motorized objects are ground-based remote controlled vehicles with mounted blasters (e.g., projectile-firing devices 104) or "explosives" (e.g., mines, grenades, etc.), which can be activated by the user 116, 118 or a remote operator. Both rovers and drones may be used as intelligence gathering with or without mounted blasters, where a camera feed is shown on the display 154 of a device 152, the HUD display 142, remote device 110, or other viewable display. Control over these units could be contested as part of gameplay, where there is only one available rover (or drone 109), and certain successful actions give one player or team access to it for a period of time.

The home base/capture point stations 172 are configured to communicate with the application via the network 102. The stations 172 allows players to refill projectiles (e.g., ammunition or rounds) physically, as well as digitally, per the gaming mode or configuration. Proximity to the stations 172 can offer "healing," restoring lost health points while in-game. The stations 172 may also serve as a respawn point; for example, if a player is eliminated during gameplay, the player must physically return to the player's team station 172 in order to return to the game. The game mode or configuration may determine the respawn timer (i.e., how long a player must wait to respawn), as well as the number of respawns possible per player. In addition, these stations 172 can serve as extensible capture points in appropriate game modes, where one team must hold multiple points simultaneously by positioning their players near it and keeping the opposing players away. Proximity can be determined by RF, NFC, GPS, blasting the object within a repeating time window, or a combination of these and/or other methods.

The bunkers 174 in an embodiment are rapidly inflating and self-storing inflatable fold-out panels composed of rubber sheets, bistable spring sheets, and inflatable structural beams. The bunkers 174 include an attached pump or compressed air storage tank whereby the inflatable structural beams are inflated and the air pressure folds out the panels. Fixtures at the base of the unit can assist in maintaining the panel firmly in place. Inflation and deflation of the bunkers 174 may be controlled by the application and/or the users 116, 118 utilizing any of the methods described herein to activate or deactivate battlefield objects. For example, the users 116, 118 may deploy the bunkers 174 by activating the bunkers 174 via the remote device 112, the display 154, or through an interface available through the extended-reality device 105 and/or the HUD display 142. The bunkers 174 may also be manually inflated/deflated by the users 116, 118. The application may also keep track of which bunkers 174 are deployed/inflated, and their location or proximity to other battlefield objects in accordance with several embodiments disclosed herein.

The turrets 176 are configured to be in communication with the network 102 and controllable through a variety of methods, as disclosed herein. For example, global, connected true "video games" can be augmented into the application to allow for control of a turret 176 via the internet from users worldwide. The turret 176 may be controllable via the application by a team's user 116. Controlling the turret 176 may include placing the turret 176 in a "sentry" mode, where if an opposing player is within a range of the turret 176, the turret 176 will fire projectiles 164 at the opposing player. The turret 176 may include motion sensors or body-detecting cameras to allow for "sentry" functionality. The turrets 176 may be configured to be semi-autonomous (e.g., partially player controlled) and fully autonomous (e.g., player puts turret 176 into "mode"). The turrets 176 preferably include a standalone target 108 so that hit detection and correlation may occur. This functionality would allow a team to "take out" or deactivate a turret 176 during gameplay, or capture the turret 176 for the opposing team's advantage. The ability to detect hits and correlate the hits with particular players in the battlefield scenario may enhance gameplay with rewards, loot, or other asymmetrical advantages to players for completing interactions according to the active gameplay mode or configuration.

In an embodiment, according to an "adversarial" target mode, a device 104 mounted on or near the target is aimed at the user 116. Under certain game modes, the turret 176 would fire back at the player (e.g., a "wild west quick draw" mode). If the user 116 does not hit the target quickly enough, the turret 176 shoots back and the user 116 loses the round. This same mode could also be configured to operate with a standalone target 108. The adversarial mode can also be configured to enable a human player to remotely control the adversarial blaster via internet through the network 102.

As with the bunkers 174, the turrets 176 may be player-deployable or "permanent" (e.g., at a venue) turrets 176 that can be controlled directly or remotely, and/or be automated via motion detection, computer vision, or at random. The turrets 176 preferably would contain the same hit detection systems as the wearable devices 106, the standalone targets 108, and the monolithic targets 148, allowing players to "destroy" them by hitting them a number of times, and allowing attribution of the turrets' 176 hits to the appropriate player or team. These turrets 176 could allow disabled or remote players to engage with their friends on the battlefield, either via the internet, nearby RF, or hands-on controls.

The barriers 178 preferably are deployable static barriers, similar to the bunkers 174, but "permanent" for that particular gaming session. For example, teams could be given a number of player-portable barriers to set up before the match, enabling a more interesting playspace on an otherwise flat arena such as a sports field. The barriers 178 can be constructed of lightweight but durable fabric on a collapsible frame similar to a folding chair or umbrella. They can also be printed with branded or themed livery.

As described herein, global, connected true "video games" can be augmented into the application to allow for control via the internet from users worldwide. Semi-autonomous or fully autonomous extensions may include "swarms" or "strikes" from mobile platforms for tournaments or larger-scale battles.

In place of the permanent or semi-permanent battlefield objects illustrated in FIG. 6, capturable objects may be deployed in accordance with certain game modes. For example, in "capture-the-flag" gaming modes, the capturable objects preferably can detect their proximity to a team's home base/capture point station 172 through RF or NFC, or the like, and know when they are in motion via accelerometer and/or GPS, allowing the network to alert players when a "flag" is being captured.

Beyond capturable objects, the battlefield objects illustrated in FIG. 6 may include battlefield "ordinance" and accessories. For example, the battlefield objects may include mines that are deployable, proximity detonated battlefield objects that blast projectiles outward. In an embodiment, the mines do not blast projectiles outward, but are controlled by the application to credit a "hit" from the mine in connection with a particular user 116 within range of the mine proximity. In this case, a player coming too close to a mine is notified via audio/video/haptic feedback that they have been hit, and the hit credited against the player. This can also work without projectiles, where a player coming too close is simply notified via A/V/H feedback that they have been hit. Alternately, the projectiles can be ejected, outward but not be required to impact the player-worn target in order to count, and thus simply providing tactile feedback for the hit.

The battlefield objects may also include thrown objects by the player. Similar to the mines described above, "grenades" may be utilized and would simulate an explosion.

As described herein, the type of weapon or projectile-firing device 104 may be virtual, utilizing the network 102 and NFC or other electronic means to allow for battlefield pickup of different weapon types or accessories. For example, a small object preferably can be picked up and placed near or attached to the Smart Blaster (or via interaction with a static battlefield object, e.g., shooting a target), telling it to change configuration and registering it in the system as a new weapon type. Table 1 below illustrates potential examples of various weapon types within the scope of the present invention in accordance with a gaming mode or configuration.

TABLE 1

| Type | Capacity | Reload Time | DMG per hit | Rate of Fire |
|---|---|---|---|---|
| Revolver | 6 rounds | 3 seconds | 1 | 1 shot per sec. |
| Automatic | 30 rounds | 5 seconds | 2 | physical |
| Bazooka | 1 round | 10 seconds | 20 (splash) | N/A |
| Sniper | 1 round | 4 seconds | 7 | N/A |

The "Revolver" of Table 1 includes a six-round capacity, requiring a player to reload the Revolver after firing six shots. To reload another six rounds, the Revolver is controlled to wait 3 seconds before being able to fire another round from the next six rounds. Each round inflicts 1 DMG per successful hit. The rate of fire is limited to 1 shot per second. The "Automatic" blaster of Table 1 includes a 30-round capacity with a reload time of 5 seconds. The DMG per hit for the Automatic is higher than the Revolver, at 2 DMG per hit. The rate of fire is not limited and may utilize the physical rate of fire available to the projectile-firing device 104. Alternatively, the rate of fire may be limited. The Bazooka of Table 1 is a "splash-damage" capable option. Since the Bazooka is a slower-firing weapon type, and inflicts greater damage per hit, its reload time is slower than other types of weapons and does not have more than one round in its capacity. The Sniper of Table 1 includes a 1 round capacity with a 4-second reload time, which limits the rate of fire by a 4-second interval. The Sniper has a greater damage capacity of 7 damage than the Revolver or the Automatic. One of ordinary skill in the art would understand that the various weapon types and parameters are fluid and may change depending on the gameplay configuration. For example, a range or "overheat" timer could be specified by weapon type.

In an embodiment, the trigger 124 of the device 104 is electronic; thus, the "reload" and related reload time can be enforced by disabling the trigger until the player hits a reload button, after which a reload timer is activated. Audible, visual, and haptic feedback can be provided for all of these actions and states (e.g., out of "digital" rounds/ammunition).

Similarly, the rate of fire can be controlled, only registering a trigger 124 pull or firing a projectile 164 at the appropriate time interval. Semi and fully automatic modes may be manually or automatically controlled, as described herein.

The system 100 calculates damage digitally through data received from the network 102. For example, the device 104 provides a signal indicating its weapon type; if the target 108, 148 or wearable device 106 is "hit," the target 108, 148 or wearable device 106 will know the weapon type and use the weapon characteristics (e.g., as disclosed in Table 1) to calculate the damage. Alternatively, or in combination, the application calculates damage inflicted on a battlefield object by a particular weapon type. The application, hosted in the cloud-computing system 110, may store a lookup table or other suitable tracking method within a database, or the like, to track and credit hits by/to certain battlefield objects, as more fully described herein. In an embodiment, the damage inflicted by a particular weapon type may be degraded or decreased at outer limits of the weapon type's range.

Splash damage, such as from a Bazooka, mine, or grenade, can be calculated by a proximity system, as more fully described herein. The splash damage may be greater the closer the battlefield object/target 108, 148 or wearable device 106 is from the epicenter of the "explosion." An IR device associated with the projectile-firing device 104 may be utilized to track splash damage. For example, a number of targets may be "pre-painted" with IR, which will hold them as painted for a fixed period of time, and if one is hit with a projectile within that window, they each receive damage.

Various means of swapping weapon types is within the scope of the present invention. For example, a variety of "skins" could be implemented, such as shells that attach or slide over the projectile-firing device 104. These skins could have the necessary electronics to tell the blaster what weapon type to become. The skins could combine both physical and virtual objects in accordance with a particular weapon type.

Other objects could be utilized to provide users 116, 118 with varying attributes for in-game performance. For example, stickers containing passive NFCs can be provided as packs, and players can affix them to objects of their choice to place around the battlefield, allowing loot drops including weapon types and upgrades; these objects could be misplaced without much loss, as new stickers can be easily replaced. In addition, scopes or silencers may be provided as accessories to the device 104 to provide relative effects on gameplay. For example, the scope could increase the range at which a particular weapon type is effective.

FIG. 7 is a flow diagram of an extended-reality projectile-firing gaming method 200. At Step 202, a gaming session in accordance with a predetermined gameplay configuration is initiated. The extended-reality gaming application is configured, in a preferred embodiment, to control and communicate instructions and/or messages to initiate the gaming session. Alternatively, or in combination, the remote device 112 is configured to initiate the gaming session.

At Step 204, projectile-firing device data is received from one or more blasters (e.g., projectile-firing devices 104, 152.) The projectile-firing device data preferably includes data configured to update gaming metric data in accordance with a gameplay configuration. The gameplay configuration may specify requirements for the gaming session, including available health points, shields, blaster types, available rounds, reload interval times, rounds per magazine, and battlefield objectives, among other things. The gaming metric data in a preferred embodiment tracks player scores, updating the gaming metric data to confirm successful impacts (e.g., projectile hits) from particular blasters 104 against particular wearable 106 and non-wearable battlefield objects 108, 148, 172, 176, etc. Thus, the projectile-firing device data includes data indicating that a projectile was fired, the time the projectile was fired, and location and orientation information. The projectile-firing device data may also include information obtainable from one or more sensors, such as near-field communication, radio frequency, infrared, magnetometer, and global positioning satellite sensory data.

At Step 206, battlefield object data is received from one or more battlefield objects such as wearable or non-wearable devices. The battlefield object data preferably includes data configured to update gaming metric data in accordance with a gameplay configuration. Thus, the battlefield object data preferably includes information that the battlefield object 106, 108, 148, 172, 176, etc., was impacted with a fired projectile, the time of impact, and the location and orientation of the battlefield object. The battlefield object data may also include information obtainable from one or more sensors, such as near-field communication, radio frequency, infrared, magnetometer, and global positioning satellite sensory data. The battlefield object data may wholly, or partly, be provided via an affixed remote device 112 configured to provide the sensory data.

As described above, at Steps 204 and 206, the projectile-firing device data and the battlefield object data are received. In a preferred embodiment, these data are received by the cloud-based computing system 110 via the network 102 and usable by the extended-reality gaming application. In other embodiments, these data are received by a standalone application at the physical location of the gaming session, or may be a combination of cloud-based and physical location-based computing and processing. One or more remote computing centers or systems may be utilized to receive and process the data.

At Step 208, the firing of a projectile is confirmed, and a time stamp is associated with the firing of the projectile. For example, the data tracks the projectiles as they are fired by the projectile-firing device 104, and provides time stamps when each projectile was fired in real- or near-real-time. At Step 210, the location and orientation of the blaster that fired the projectile are determined. As described above, the sensory data from the projectile-firing device data is preferably utilized to determine the location and orientation of the blaster.

At Step 212, an impact on a battlefield object is confirmed, and a time stamp is associated with the impact on the battlefield object. For example, the battlefield object is tracked to perceive impacts on wearable devices 106 and/or non-wearable devices 108, 148, 172, 176, etc. At Step 214, the location and orientation of the battlefield object are determined. As described above, the sensory data from the projectile-firing device data is preferably utilized to determine the location and orientation of the battlefield object.

At Step 216, it is determined whether the time the projectile was fired and the time of the impact on the battlefield object are within a predetermined time period. For example, the predetermined time is measured in milliseconds, as the blaster's projectile velocity is preferably at least 90 FPS and can exceed 200 FPS. This determination provides confirmation that the blaster shot the particular projectile that was detected by the particular battlefield object.

At Step 218, it is determined whether the location of the blaster that fired the projectile and the battlefield object detecting the impact are at locations within a predetermined area. As described herein, the physical range of the blaster 104 is limited, but the blaster 104 may be further limited by the application such that certain impacts outside of the predetermined area are outside of the permitted blaster's 104 range. The location determination permits further confirmation that the blaster shot the particular projectile that was detected by the particular battlefield object.

At Step 220, it is determined whether the orientation of the blaster that fired the projectile is oriented with the orientation of the battlefield object detecting an impact by a projectile. If the orientation is within a predetermined direction or orientation, the orientation determination permits further confirmation that the blaster shot the particular projectile that was detected by the particular battlefield object.

At Step 222, the gaming metric data is updated confirming a successful impact on the battlefield object and a successful hit by the blaster 104. The updated gaming metric data attributes a decrease in health points to a user or battlefield object that was impacted by the blaster 104, in accordance with the gaming configuration, and attributes damage inflicted upon the user or battlefield object to the user associated with the blaster 104. The gaming metric data in a preferred embodiment tracks player scores, updating the gaming metric data to confirm successful impacts (e.g., projectile hits) from particular blasters 104 against particular wearable 106 and non-wearable battlefield objects 108, 148, 172, 176, etc. in real- or near-real-time.

The determinations in Steps 216, 218, and 220 and the updating of the gaming metric data in Step 222 are preferably conducted using the gaming application.

FIG. 8 is a flow diagram of an extended-reality projectile-firing gaming method 300. At Step 302, blaster data is received from a blaster 104. The blaster data is preferably the projectile-firing device data associated with method 200. At Step 304, wearable vest data is received from a wearable vest 106. The wearable vest data is preferably the battlefield object data associated with method 200. At Step 306, battlefield object data is received from a battlefield object 108, 148, 172, 176, etc. The battlefield object data is preferably the same battlefield object data associated with method 200.

At Step 308, the time of firing of a fired projectile from the blaster 104 is recorded. Preferably the time of firing is recorded and stored in connection with the gaming application. At Step 310, an impact of the fired projectile on the wearable vest 106 is confirmed. The methodology for determining an impact on a wearable vest 106 is disclosed elsewhere herein. At Step 312, the time of impact of the fired projectile on the wearable vest 106 is recorded. At Step 314, an impact of the fired projectile on the battlefield object 108, 148, 172, 176, etc. is confirmed. The methodology for determining an impact on a battlefield object 108, 148, 172, 176, etc. is disclosed elsewhere herein. At Step 316, the time of impact of the fired projectile on the battlefield object 108, 148, 172, 176, etc. is recorded.

At Step 318, it is determined whether the time of impact on the wearable vest 106 and the time of firing the fired projectile is within a predetermined time period. This determination provides confirmation that the blaster shot the particular projectile that was detected by the particular wearable vest. At Step 320, it is determined whether the time of impact on the battlefield object 108, 148, 172, 176, etc. and the time of firing the fired projectile is within a predetermined time period. This determination provides confirmation that the blaster shot the particular projectile that was detected by the particular battlefield object. For example, the predetermined time is measured in milliseconds, as the blaster's projectile velocity is preferably at least 90 FPS and can exceed 200 FPS.

At Step 322, a successfully fired projectile attributed to the blaster 104 is recorded. Preferably the application records the successful hit of the projectile and associates the successful hit with the blaster 104 and the associated user. At Step 324, a successful impact on the wearable vest 106 and/or the battlefield object 108, 148, 172, 176, etc. is recorded. Preferably the application records the successful impact of the projectile on either the wearable vest 106 and/or the battlefield object 108, 148, 172, 176, etc. In practice, a blaster's 104 projectile will likely only be attributable to a single wearable vest 106 or a single battlefield object 108, 148, 172, 176, etc. However, when another projectile-firing device such as a Bazooka, mine, or grenade involves splash damage, one or more wearable vests 106 and/or battlefield object 108, 148, 172, 176, etc. may be impacted by a single "explosion."

At Step 326, the gaming metric data is updated to record the successful impact and the successful hit and attribute each to corresponding devices and their associated users.

It will be appreciated by one of ordinary skill in the art that method 300 does not specifically include location and/or orientation confirmation of successful impacts or hits. However, those confirmations may be implemented in the method 300. Alternatively, any combination of timing, location, and orientation data and/or information may be provided to confirm successful impacts or hits, and are within the scope of the present invention.

It will also be appreciated that the updated gaming metric data identified in the methods 200, 300 preferably is provided to the projectile-firing devices 104, 152, the display 154, and/or the HUD display 142, and/or the like, to provide updated gaming score information in accordance with the gaming configuration during the gaming session in real- or near-real-time.

In a preferred embodiment of the present invention, functionality is implemented as software executing on a server that is in connection, via a network, with other portions of the system, including databases and external services. The server comprises a computer device capable of receiving input commands, processing data, and outputting the results for the user. Preferably, the server consists of RAM (memory), hard disk, network, central processing unit (CPU). It will be understood and appreciated by those of skill in the art that the server could be replaced with, or augmented by, any number of other computer device types or processing units, including but not limited to a desktop computer, laptop computer, mobile or tablet device, or the like. Similarly, the hard disk could be replaced with any number of computer storage devices, including flash drives, removable media storage devices (CDs, DVDs, etc.), or the like.

The network can consist of any network type, including but not limited to a local area network (LAN), wide area network (WAN), and/or the internet. The server can consist of any computing device or combination thereof, including but not limited to the computing devices described herein, such as a desktop computer, laptop computer, mobile or tablet device, as well as storage devices that may be connected to the network, such as hard drives, flash drives, removable media storage devices, or the like.

The storage devices (e.g., hard disk, another server, a NAS, or other devices known to persons of ordinary skill in the art), are intended to be nonvolatile, computer readable storage media to provide storage of computer-executable instructions, data structures, program modules, and other data for the mobile app, which are executed by CPU/processor (or the corresponding processor of such other components). The various components of the present invention, are stored or recorded on a hard disk or other like storage devices described above, which may be accessed and utilized by a web browser, mobile app, the server (over the network), or any of the peripheral devices described herein. One or more of the modules or steps of the present invention also may be stored or recorded on the server, and transmitted over the network, to be accessed and utilized by a web browser, a mobile app, or any other computing device that may be connected to one or more of the web browser, mobile app, the network, and/or the server.

References to a "database" or to "database table" are intended to encompass any system for storing data and any data structures therein, including relational database management systems and any tables therein, non-relational database management systems, document-oriented databases, NoSQL databases, or any other system for storing data.

Software and web or internet implementations of the present invention could be accomplished with standard programming techniques with logic to accomplish the various steps of the present invention described herein. It should also be noted that the terms "component," "module," or "step," as may be used herein, are intended to encompass implementations using one or more lines of software code, macro instructions, hardware implementations, and/or equipment for receiving manual inputs, as will be well understood and appreciated by those of ordinary skill in the art. Such software code, modules, or elements may be implemented with any programming or scripting language such as C, C++, C#, Java, Cobol, assembler, PERL, Python, PHP, or the like, or macros using Excel or other similar or related applications with various algorithms being implemented with any combination of data structures, objects, processes, routines or other programming elements.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An extended-reality projectile-firing gaming system comprising:
a projectile-firing device comprising a projectile repository,
a battlefield object,
a network configured to provide communication and control connectivity in accordance with at least one protocol to the projectile-firing device and the battlefield object, and
an extended-reality gaming application configured to
control the projectile-firing device and the battlefield object in accordance with a gaming session having a gameplay configuration for providing an extended-reality environment,
receive projectile-firing device data from the projectile-firing device, the projectile-firing device data indicating that a projectile was fired and a time the projectile was fired,
receive battlefield object data from the battlefield object, the battlefield object data indicating that an impact occurred on the battlefield object, and a time the battlefield object was impacted,
update gaming metric data to indicate a successful impact of the fired projectile on the battlefield object and a successful hit by the projectile-firing device on the battlefield object when the time the impact occurred on the battlefield object and the time the projectile was fired occur within a predetermined time period, wherein the updated gaming metric data is further configured to receive a location and orientation of the projectile-firing device, wherein the extended-reality gaming application records a successful impact of the fired projectile on the battlefield object and a successfully fired projectile by the projectile-firing device associated with the battlefield object when the location of the projectile-firing device is within a predetermined range from the battlefield object and the orientation of the projectile-firing device is aligned at a predetermined area associated with the battlefield object.

2. The extended-reality projectile-firing gaming system of claim 1 wherein the extended-reality gaming application is further configured to track user scores and skill improvements in accordance with the gameplay session.

3. The extended-reality projectile-firing gaming system of claim 1 further comprising a target configured to detect impact of projectiles thereon.

4. The extended-reality projectile-firing gaming system of claim 1 further comprising an extended-reality device configured to provide computer-aided vision for display of real and virtual objects and a computer-aided interface for interaction with the real and virtual objects.

5. The extended-reality projectile-firing gaming system of claim 4 wherein the extended-reality device comprises a heads-up display configured to display information corresponding to the gameplay configuration and the updated gaming metric data.

6. The extended-reality projectile-firing gaming system of claim 4 further comprising at least one virtual extended-reality object in accordance with the gameplay configuration and configured to be viewable through the extended-reality device.

7. The extended-reality projectile-firing gaming system of claim 1 wherein the extended-reality gaming application is configured to provide commands and instructions via the network in accordance with the gameplay configuration to at least one of the projectile-firing device and the battlefield object.

8. The extended-reality projectile-firing gaming system of claim 1 further comprising a remote device configured to receive data via the network from at least one of the projectile-firing device and the battlefield object.

9. The extended-reality projectile-firing gaming system of claim 8 wherein the remote device is configured to be affixed to the projectile-firing device and provide at least one of near-field communication, radio frequency, infrared, magnetometer, and global positioning satellite sensory data to the extended-reality gaming application.

10. The extended-reality projectile-firing gaming system of claim 1 wherein the gameplay configuration comprises information corresponding to at least one of a game mode, a health meter, a shield meter, a projectile tally, a projectile repository tally, a rate of fire, a reload interval, a virtual power up, a success tally, a failure tally, a success to failure ratio, an alert, a battlefield role, a team affiliation, a battlefield objective, and a set of battlefield parameters.

11. The extended-reality projectile-firing gaming system of claim 1 wherein the projectile-firing device is configured to receive instructions and commands to control one or more of an amount of projectiles available for firing, a predetermined velocity of the projectiles for firing, a predetermined rate of fire of the projectiles, and a predetermined reload interval of the amount of projectiles.

12. The extended-reality projectile-firing gaming system of claim 11 wherein the extended-reality gaming application is configured to increase or decrease the predetermined velocity in accordance with the gameplay configuration.

13. The extended-reality projectile-firing gaming system of claim 1 wherein the projectile-firing device is configured to increase or decrease a predetermined velocity at which the projectile-firing device is configured to fire the projectile in accordance with the gameplay configuration.

14. The extended-reality projectile-firing gaming system of claim 1 wherein the projectile-firing device comprises a display.

15. The extended-reality projectile-firing gaming system of claim 1 further comprising a non-wearable device configured to communicate via the network with at least one of the projectile-firing device and the battlefield object and detect impact of projectiles thereon.

16. The extended-reality projectile-firing gaming system of claim 1 wherein the extended-reality gaming application is configured to provide virtual extended-reality real-time or near real-time overlays in accordance with the extended-reality environment.

17. The extended-reality projectile-firing gaming system of claim 1 wherein the battlefield object is a wearable device.

18. An extended-reality projectile-firing gaming method, the method comprising the steps of:
 initiating a gaming session having a gameplay configuration for providing an extended-reality environment, the gaming configuration comprising gaming metric data configured to track at least scoring during the gaming session,
 providing commands and instructions via a network configured to communicate with and control one or more of a projectile-firing device and a battlefield object in accordance with at least one protocol,
 receiving projectile-firing device data from the projectile-firing device, the projectile-firing device data indicating that a projectile was fired and a time the projectile was fired,
 receiving battlefield object data from the battlefield object, the battlefield object data indicating that an impact occurred on the battlefield object, and a time the battlefield object was impacted,
 updating the gaming metric data to indicate a successful impact of the fired projectile on the battlefield object and a successful hit by the projectile-firing device on the battlefield object when the time the impact occurred on the battlefield object and the time the projectile was fired occur within a predetermined time period, and
 receiving a location and orientation of the projectile-firing device, wherein the gaming metric data is updated to indicate the successful impact and the successful hit when the location of the projectile-firing device is within a predetermined range from the battlefield object and the orientation of the projectile-firing device is pointed at a predetermined area associated with the battlefield object.

19. An extended-reality projectile-firing gaming method, the method comprising the steps of:
 initiating a gaming session having a gameplay configuration for providing an extended-reality environment, the gaming configuration comprising gaming metric data configured to track at least scoring during the gaming session, providing commands and instructions via a network configured to communicate with and control one or more of a projectile-firing device and a battlefield object in accordance with at least one protocol, receiving projectile-firing device data from the projectile-firing device, the projectile-firing device data indicating that a projectile was fired and a time the projectile was fired, receiving battlefield object data from the battlefield object, the battlefield object data indicating that an impact occurred on the battlefield object, and a time the battlefield object was impacted, updating the gaming metric data to indicate a successful impact of the fired projectile on the battlefield object and a successful hit by the projectile-firing device on the battlefield object when the time the impact occurred on the battlefield object and the time the projectile was fired occur within a predetermined time period, and receiving a location and orientation of the battlefield object, wherein the gaming metric data is updated to indicate the successful impact and the successful hit when the location of the battlefield object is within a predetermined range from the projectile-firing device and the orientation of the battlefield object is oriented toward the orientation of the projectile-firing device.

20. The method of claim 19 further comprising receiving target data from a target configured to detect impact of projectiles thereon.

21. The method of claim 19 further comprising receiving commands and instructions from at least one of the projectile-firing device and the battlefield object at a remote device and displaying information corresponding to the commands and instructions on the remote device.

22. The method of claim 19 further comprising receiving extended-reality device data from at least one extended-reality device configured to provide computer-aided vision for display of real and virtual objects and a computer-aided interface for interaction with the real and virtual objects.

23. The method of claim 19 further comprising controlling one or more of an amount of projectiles available for firing, a predetermined velocity of the projectiles for firing, a predetermined rate of fire of the projectiles, and a predetermined reload interval of the amount of projectiles.

24. The method of claim 19 further comprising adjusting the predetermined velocity in accordance with the gameplay configuration.

25. An extended-reality projectile firing gaming method comprising receiving projectile-firing device data from a projectile-firing device comprising a projectile repository, receiving battlefield object data from a battlefield object, confirming an impact of the fired projectile on the battlefield object, recording a time of the impact of the fired projectile on the battlefield object, recording a time of firing of the fired projectile associated with the projectile-firing device, recording a successful impact of the fired projectile on the battlefield object and a successfully fired projectile from the projectile-firing device when the time of the impact on the battlefield object and the time of firing of the fired projectile occur within a predetermined time period, and updating gaming metric data comprising the successful impact and the successfully fired projectile, and receiving a location of the projectile-firing device, wherein the successful impact and the successfully fired projectile are recorded when the location of the projectile-firing device is within a predetermined range from the battlefield object at the time when the fired projectile was fired.

26. An extended-reality projectile firing gaming method comprising receiving projectile-firing device data from a projectile-firing device comprising a projectile repository, receiving battlefield object data from a battlefield object, confirming an impact of the fired projectile on the battlefield object, recording a time of the impact of the fired projectile on the battlefield object, recording a time of firing of the fired projectile associated with the projectile-firing device, recording a successful impact of the fired projectile on the battlefield object and a successfully fired projectile from the projectile-firing device when the time of the impact on the battlefield object and the time of firing of the fired projectile occur within a predetermined time period, and updating gaming metric data comprising the successful impact and the successfully fired projectile, and receiving an orientation of the projectile-firing device, wherein the successful impact and the successfully fired projectile are recorded when the orientation of the projectile-firing device is pointed at a predetermined area associated with the battlefield object at the time when the fired projectile was fired.

* * * * *